United States Patent
Tung Ng et al.

(10) Patent No.: US 6,279,008 B1
(45) Date of Patent: Aug. 21, 2001

(54) INTEGRATED GRAPHICAL USER INTERFACE METHOD AND APPARATUS FOR MAPPING BETWEEN OBJECTS AND DATABASES

(75) Inventors: Tony Chun Tung Ng, Fremont; Rahul Sharma, Santa Clara; Timothy R. Learmont, Palo Alto, all of CA (US)

(73) Assignees: Sun Microsystems, Inc., Palo Alto, CA (US); BAAN Development, B.V., The Barneveld (NL)

( * ) Notice: Subject to any disclaimer, the term of this patent is extended or adjusted under 35 U.S.C. 154(b) by 0 days.

(21) Appl. No.: 09/106,046

(22) Filed: Jun. 29, 1998

(51) Int. Cl.$^7$ .................................................. G06F 17/30
(52) U.S. Cl. ........................ 707/102; 707/103; 345/334; 345/335
(58) Field of Search ..................... 707/101, 102, 707/103; 345/334, 335

(56) References Cited

U.S. PATENT DOCUMENTS

| 5,291,583 | 3/1994 | Bapat | 395/500 |
| 5,596,746 | 1/1997 | Shen et al. | 395/612 |
| 5,717,924 | 2/1998 | Kawai | 395/613 |

(List continued on next page.)

FOREIGN PATENT DOCUMENTS

| WO 95/03586 | 2/1995 | (WO) . |
| WO 95/04960 | 2/1995 | (WO) . |
| WO 97/03406 | 1/1997 | (WO) . |

OTHER PUBLICATIONS

T. Lindholm and F. Yellin, "The Java Virtual Machine Specification" Second Edition, Apr. 1999, pp. 1–473.
"Customizable Four Pane Layout for Database Table Definition," Dec. 1992, pp. 268–269.
H. Bank, "OQL," Sep. 15, 1997 (Rev. 0.11), pp. 1–7.
"Applications in Java and Extended Java," Sep. 28, 1998, pp. 1–21.
"Sun Simplifies Database Programming with Java Blend," Aug. 21, 1997, pp. 1–3.
S. Wang, "Improvement of Concurrency Control Within Object–Oriented Database Systems," Apr. 5, 1990, IEEE, pp. 68–70.
S. Heiler and S. Zdonik, "Object Views: Extending the Vision," 1990 IEEE, pp. 86–93.
D. Agrawal, A. Bernstein, P. Gupta, and S. Sengupta, "Distributed Multi–Version Optimistic Concurrency Control for Relational Database," Mar. 1986, pp. 416–421.
X. Qian and L. Raschid, "Query Interoperation Among Object–Oriented and Relational Databases," Mar. 6, 1995, IEEE, pp. 271–278.
S. Gantimahapatruni and G. Karabatis, "Enforcing Data Dependencies in Cooperative Information Systems," May 12, 1993, IEEE, pp. 332–341.
IBM Technical Disclosure Bulletin, vol. 38, No. 01, Jan. 1995, Fast and Secure Stored Procedures for a Client/Server DBMS, pp. 79–82.

(List continued on next page.)

Primary Examiner—Jean R. Homere
(74) Attorney, Agent, or Firm—Finnegan, Henderson, Farabow, Garrett & Dunner, L.L.P.

(57) ABSTRACT

A graphical user interface on a computer system is provided for displaying objects in an object-oriented application and data stored in tables of a database. The graphical user interface displays a class view corresponding to one or more classes in the object-oriented application that in turn corresponds to tables in the database and displays a table view having one or more tables in a database corresponding to classes in the object-oriented application. In addition, the graphical user interface also displays a combination table-and-class view having database elements from the database adjacent to the object-oriented elements from the object-oriented application.

35 Claims, 21 Drawing Sheets

U.S. PATENT DOCUMENTS

| | | | | |
|---|---|---|---|---|
| 5,857,197 | | 1/1999 | Mullins | 707/103 |
| 5,878,411 | * | 3/1999 | Burroughs et al. | 707/4 |
| 5,907,846 | * | 5/1999 | Berner et al. | 707/103 |
| 5,937,409 | * | 8/1999 | Wetherbee | 707/103 |
| 5,983,020 | | 11/1999 | Sweeney et al. | 395/705 |
| 6,003,040 | * | 12/1999 | Mital et al. | 707/103 |
| 6,009,428 | * | 12/1999 | Kleewein et al. | 707/10 |
| 6,101,502 | * | 8/2000 | Heubner et al. | 707/103 |
| 6,108,664 | * | 8/2000 | Nori et al. | 707/103 |
| 6,141,660 | * | 10/2000 | Bach et al. | 707/103 |
| 6,175,837 | * | 1/2001 | Sharma et al. | 707/103 |

OTHER PUBLICATIONS

A. Alashqur and C. Thompson, "O–R Gateway: A System for Connecting C++ Application Programs and Relational Databases," Aug. 10, 1992, pp. 151–169.

R. Ahad and T. Cheng, Hewlett–Packard Journal 44 (1993) Jun., No. 3, "HP OpenODB: An Object–Oriented Database Management System for Commercial Applications," pp. 20–30.

TOPLink, "The Industry Standard for Persistence Product, A White Paper: The Object People", 1997.

IBM Technical Disclosure Bulletin, vol. 37, No. 08, Aug. 1994, "Automatically Revising Function Prototypes in C and C++ Implementations of System Object Model Classes," pp. 363–365.

C. Kleissner, "Enterprise Objects Framework, A Second Generation Object–Relational Enabler," Jun. 1995, pp. 455–459.

"The Enterprise Objects Framework," Jul. 1994, pp. 1–12.

SQL Tutorial: Introduction to Structured Query Language, Version 3.63 (May 1998), URL http://w3.one.net/~jhoffman/sqltut.htm#Compound Conditions.

The JDBC Database Access API (Apr. 1998), URL http://java.sun.com/products/jdbc.

O'Brien, Stephen K., "Turbo Pascal 5.5: The Complete Reference", Osborne/McGraw–Hill (1989), pp. 500–522.

Gosling, Joy, and Steele, "The Java™ Language Specification", Addison–Wesley (1996).

Hamilton, Cattell, and Fisher, "JDBC Database Access with Java™", Addison–Wesley (1997).

R.G.G. Cattell et al., "Object Database Standard: ODMG 2.0", Morgan Kaufman Publishers, Inc. (1997).

Campione, Mary and Kathy Walrath, "The Java™ Tutorial", Addison–Wesley (1996).

* cited by examiner

INTEGRATED GRAPHICAL USER INTERFACE METHOD AND APPARATUS FOR MAPPING BETWEEN OBJECTS AND DATABASES

RELATED APPLICATIONS

The following identified U.S. patent applications are relied upon and are incorporated by reference in their entirety in this application.

Provisional U.S. patent application Ser. No. 60/068,415, entitled "System and Method for Mapping Between Objects and Databases," filed on Dec. 22, 1997.

U.S. patent application Ser. No. 09/106,186, entitled "Object Relational Mapping Tool That Processes Views", and filed on the same date herewith.

U.S. patent application Ser. No. 09/106,189, entitled "Evolution Of Object-Relational Mapping Through Source Code Merging", and filed on the same date herewith.

U.S. patent application Ser. No. 09/105,957, entitled "Integrating Both Modifications to an Object Model and Modifications to a Database into Source Code by an Object-Relational Mapping Tool", and filed on the same date herewith.

U.S. patent application Ser. No. 09/106,210, entitled "Rule-Based Approach to Object-Relational Mapping Strategies," and filed on the same date herewith.

U.S. patent application Ser. No. 09/106,212, entitled "User Interface for the Specification of Lock Groups", and filed on the same date herewith.

U.S. patent application Ser. No. 09/106,119, entitled "A Fine-Grained Consistency Mechanism for Optimistic Concurrency Control Using Lock Groups", and filed on the same date herewith.

U.S. patent application Ser. No. 09/106,211, entitled "User Interface for the Specification of Index Groups Over Classes", and filed on the same date herewith.

U.S. patent application Ser. No. 09/106,188, entitled "Method and Apparatus for Creating Indexes in a Relational Database Corresponding to Classes in an Object-Oriented Application", and filed on the same date herewith.

U.S. patent application Ser. No. 09/106,190, entitled "Method and Apparatus for Loading Stored Procedures in a Database Corresponding to Object-Oriented Data Dependencies", and filed on the same date herewith.

U.S. patent application Ser. No. 09/105,955, entitled "Methods and Apparatus for Efficiently Splitting Query Execution Across Client and Server in an Object-Relational Mapping", and filed on the same date herewith.

BACKGROUND OF THE INVENTION

1. Field of the Invention

This invention generally relates to database systems for computers and more particularly, to an integrated graphical user interface method and apparatus for mapping between objects and databases.

2. Description of the Related Art

Object-database mapping tools assist in integrating tables in a database with corresponding classes in an object-oriented application. Conventional object-database mapping tools receive class definitions from an object-oriented application and automatically generate code, typically stored in a database schema, to create tables and other structures for the database. The tables and structures in the database are used to hold data corresponding to objects generated by an object-oriented application.

There are numerous challenges to improve the techniques for integrating object-oriented applications and databases using these object-database mapping tools. In particular, these techniques need to account for the different organization of data in an object-oriented application compared with the organization of data in a database.

In an object-oriented application the skeleton of an object is a class. The class may have a number of fields used to store values or parameters typically used by object instances of the class. The class may also include specific methods which define how objects instantiated from each class will interact with each other and hold certain information in each of the corresponding fields. A hierarchical class structure provides an organized framework for creating objects and their relationships.

In contrast, databases have features that object-oriented applications do not possess. The database typically organizes data using one or more tables having multiple rows and columns. A data relationship is defined by the manner in which data is stored in the various rows and columns of the tables. A single table or multiple tables can be used to hold every row or record of data. A primary key includes one or more columns in a table that uniquely identifies each row of data. If multiple tables are used to store a data, a foreign key associates rows of data in one table with another table.

Unfortunately, conventional object-database mapping tools do not provide sophisticated techniques for integrating object-oriented applications and databases. Generally, the user must resort to multiple object-oriented development tools, database tools, and object-database mapping tools to integrate these two disparate systems. The numerous tools required to integrate such systems can be expensive and often will not work together smoothly.

Existing object-database mapping tools also make it difficult for the user to test and refine the integration of object-oriented applications and databases. For example, conventional object-database mapping tools do not allow a user to make a round-trip between a database and an object oriented application. That is, the user can not generate a database from a object-oriented application, modify the database, and then regenerate a portion of the object-oriented application. This prevents a user from quickly testing such an integrated system using various design scenarios. Furthermore, conventional user interfaces for performing such features are not properly designed to support these more sophisticated techniques for integrating object-oriented applications and databases.

Based on the above limitations found in conventional database and object-oriented systems, it is desirable to provide improved tools for integrating objects and databases.

SUMMARY OF THE INVENTION

In accordance with methods and systems consistent with the present invention, a graphical user interface on a computer system is provided that facilitates integrating objects from an object-oriented application and data stored in tables of a database. The graphical user interface displays a class view corresponding to one or more classes in the object-oriented application that in turn corresponds to tables in the database and displays a table view having one or more tables in a database corresponding to classes in the object-oriented application. In addition, the graphical user interface also displays a combination table-and-class view having database elements from the database adjacent to the object-oriented elements from the object-oriented application.

BRIEF DESCRIPTION OF THE DRAWINGS

The accompanying drawings, which are incorporated in and constitute a part of this specification, illustrate an implementation of the invention and, together with the description, serve to explain principles of the invention.

In the drawings.

DETAILED DESCRIPTION

Overview

Figure 1:
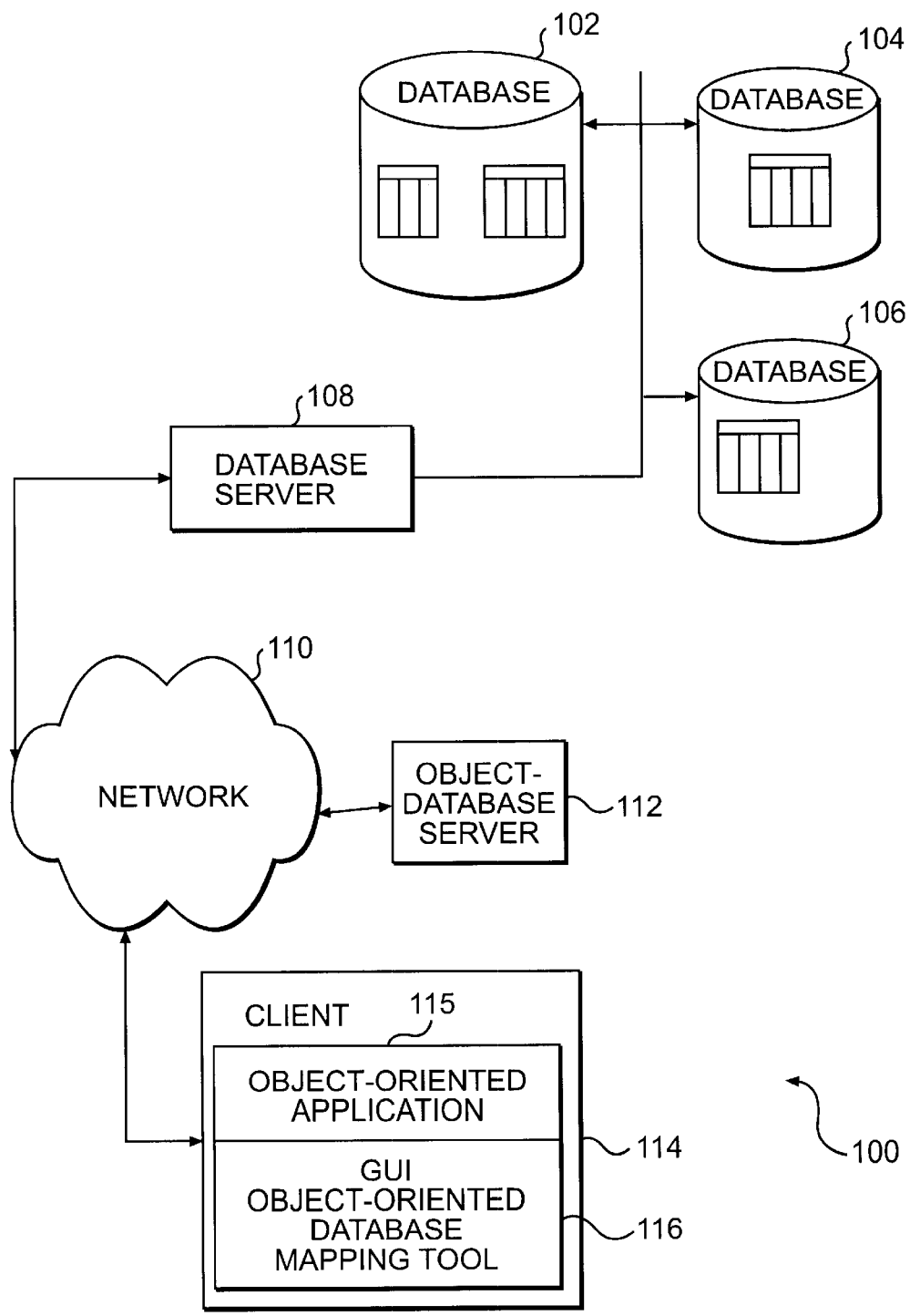
FIG. 1 is a block diagram of an enterprise system for integrating object-oriented applications and a database.

Reference will now be made in detail to an implementation of the present invention as illustrated in the accompanying drawings. The same reference numbers will be used throughout the drawings in the following description to refer to the same or like parts.

Methods and systems designed in accordance of the present invention enable a user to visualize the integration of object-oriented applications and databases. Such methods and systems use a graphical user interface (GUI) to display relationships between classes in an object-oriented application and tables in a database. A GUI designed consistent with the present invention supports object-database mapping and rapid testing of numerous object-oriented and database scenarios. This GUI allows characteristics associated with the tables in the database and the classes in the object-oriented applications to be accessed, edited, and created in an efficient manner.

Enterprise System

Systems and methods consistent with the present invention utilize a client-server environment where a client communicates with a server over a common networking protocol such as TCP/IP. These systems and methods utilize a relational database management system (RDBMS) with networking features to facilitate client-server distributed database processing techniques. Such a RDBMS, for example, receives requests from a remote computer and provides results over a network. The RDBMS also includes standard software development interfaces such as Structured Query Language (SQL), stored procedures, and a variety of concurrency control mechanisms. Data is stored in the RDBMS in a series of tables having rows and columns. The tables can be linked together through relationships in one or more columns. The terms database or relational-database are used herein to refer to a RDBMS or another type of database management system consistent with the principle of the present invention.

SQL is a standardized database language for accessing relational databases. ANSI X3H2 is the standards organization responsible for maintaining the SQL standards. Database system vendors typically include extensions and additions to the SQL standard.

Stored procedures allow users to develop software routines that manipulate tables and data in a database. Typically, stored procedures are compiled and stored in the database when the database is created. A user may indirectly invoke these stored procedures in an object-oriented application by adding, deleting, and operating on objects. The stored procedures are used to access and modify tables of data in the database corresponding to the operations performed on the objects.

Concurrency mechanisms in the database include locks and other mutual exclusion techniques to give each user a consistent view of the database. These locks and other concurrency mechanisms allow multiple users or programs to simultaneously share the same database and information. An object-oriented application indirectly uses these locks when accessing data corresponding to objects stored in the database. The locks make sure the database is consistent with the operations and modifications made when multiple applications are accessing the same objects or related objects.

FIG. 1 is a block diagram of an enterprise system 100 integrating object-oriented applications and a database. Enterprise system 100 includes databases 102, 104, 106 and a network 110 connecting an object-database server 112, a database server 108, and a client 114. Network 110 can be a combination of networks including the Internet, corporate intranets, and other networks compatible with a networking protocol such as TCP/IP. Within client 114, a GUI object-oriented database mapping tool 116 is generated consistent with systems and methods of the present invention.

Databases 102, 104 and 106 include database tables corresponding to classes used in an object-oriented application. Classes associated with a database are considered "persistence-capable" classes. The objects representing these persistence-classes can be either persistent objects or transient objects depending how they are instantiated. If an object is a persistent instance of a persistent-capable class, the object is stored in the database and is accessible to many different applications. Alternatively, if an object is a transient instance of a persistence-capable class, the object exists only while the application which instantiated the object is executing.

Object-database server 112 provides a conduit between a relational database connected to database server 108 and object-oriented applications, such as an object-oriented application 115 on client 114. In general, object-oriented applications that access persistent objects send requests written in an object-oriented language over network 110 to object-database server 112. Object-server database 112 translates the object-oriented requests to the appropriate database instructions and sends the instructions over network 110 to database server 108 for further database processing. Object-database server 112 may also provide a response back to the object-oriented application if results are generated during the database operation. Database server 108 provides database services to object-database server 112 and client 114. Database server 108 accesses data stored on databases 102, 104, and 106 in response to database instructions from object-database server 112. In alternative configurations, object-database server 112 and database server 108 may be on the same computer system or in different parts of a network other than those areas discussed above.

Figure 2:
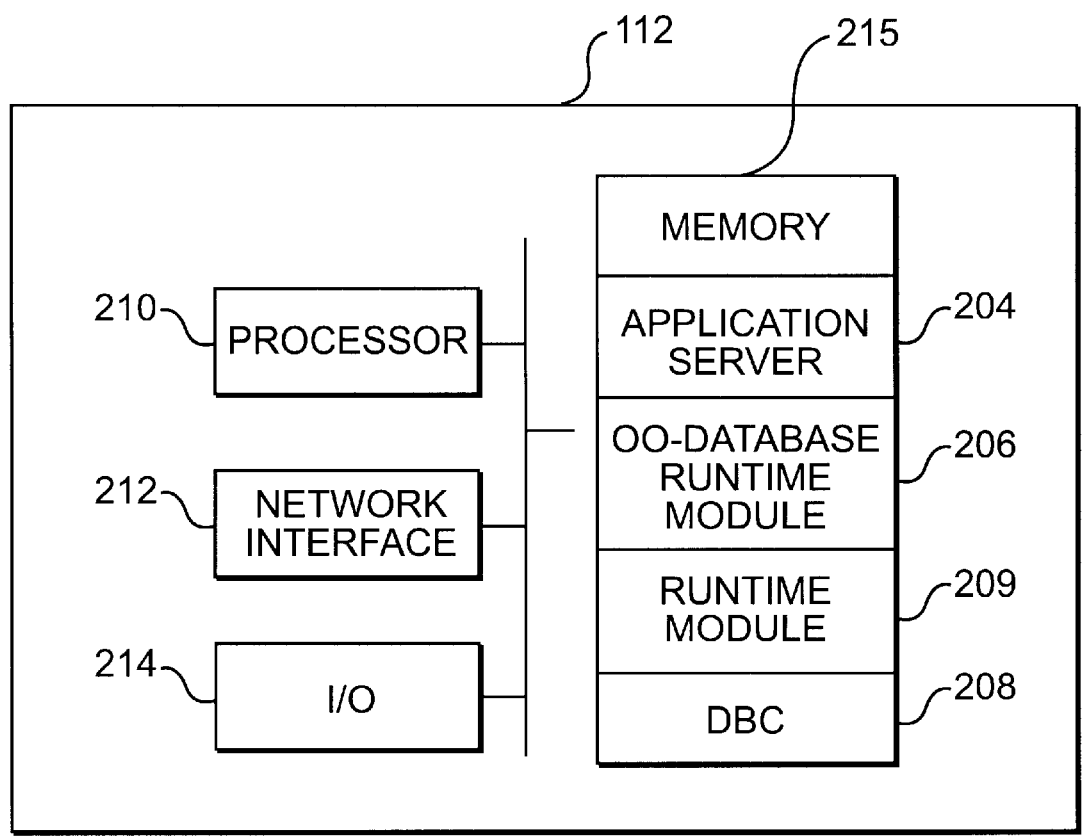
FIG. 2 is a block diagram of the subsystems associated with object-database server.

FIG. 2 is a block diagram of the subsystems associated with object-database server 112. Object-database server 112 includes a processor 210, a network interface 212, an input/output subsystem (I/O) 214, and a memory 215. Processor 210 executes instructions associated with applications contained in memory 215 and transmits information over an interconnect to other subsystems in object-database server 112. I/O 214 is an interface used to couple object-database server 112 with devices such as a keyboard, a mouse, a display device, and any other I/O device useful in operating and managing object-database server 112.

Memory 215 includes an application server 204, an object-oriented database runtime module 206, a runtime module 209, and a database connectivity (DBC) module 208. Application server 204 stored in memory 215 receives requests to access objects stored on databases 102, 104, and 106. Server 112 receives these database requests over network 116 from client 114 executing object-oriented application 115. These requests typically involve manipulating tables of information stored in one or more databases associated with database server 108. Object-oriented database runtime module 206 converts the object-oriented requests into database commands.

Object-oriented database runtime module 206 receives object-oriented instructions, such as bytecodes compatible with the Java™ programming language, to access data stored in a database. Runtime module 209 process the object-oriented instructions for execution on processor 210. Some instructions are interpreted by VM 216 and executed on processor 210. A virtual machine, such as VM 216, simulates a processor and executes on many different hardware platforms. The Java™ Virtual Machine (JVWM) is one virtual machine that promotes platform independent computing using the Java™ programming language.

Object-oriented database runtime module 206 receives object-oriented instructions, such as bytecodes compatible with the Java™ programming language, to access data stored in a database. Runtime environment 209 process the object-oriented instructions for execution on processor 210. Runtime environment 209 may include a virtual machine (VM) and corresponding development kit (DK) having object oriented class libraries. Some instructions may be interpreted by a VM and executed on processor 210. A VM simulates a processor and executes on many different hardware platforms. In one implementation, runtime environment 209 is the Java Runtime Environment having a Java™ virtual machine (JVM) and the Java™ Foundation Classes (JFC) as the development kit (DK). The Java™ Virtual Machine (JVM) is one virtual machine that promotes platform independent computing using the Java™ programming language.

Other database related instructions may use database connectivity module DBC 208 to connect object-oriented database runtime module 206 with database information. DBC 208 provides an application programming interface (API) for programmers to access a database. For example, the JDBCTM database connectivity module is one type of DBC 208 that provides an interface between Java™ applications and a database. JDBCTM database connectivity module is a Java™ application program interface (API) for executing structured query language (SQL) statements. It consists of a set of classes and interfaces written in the Java™ programming language. It provides a standard API for tool/database developers and makes it possible to write database applications using a pure Java API. JDBC is described in greater detail in Hamilton, Cattell, and Fisher, *JDBC Database Access with Java™*, Addison-Wesley (1997), which is incorporated herein by reference. For example, DBC 208 can be used to establish a logical connection with a database, send SQL statements to the database, and process the results provided from the database. (Sun, Sun Microsystems, the Sun logo, Java™, JDBC™, and Java™-based trademarks are trademarks or registered trademarks of Sun Microsystems, Inc. in the United States and other countries.)

Figure 3:
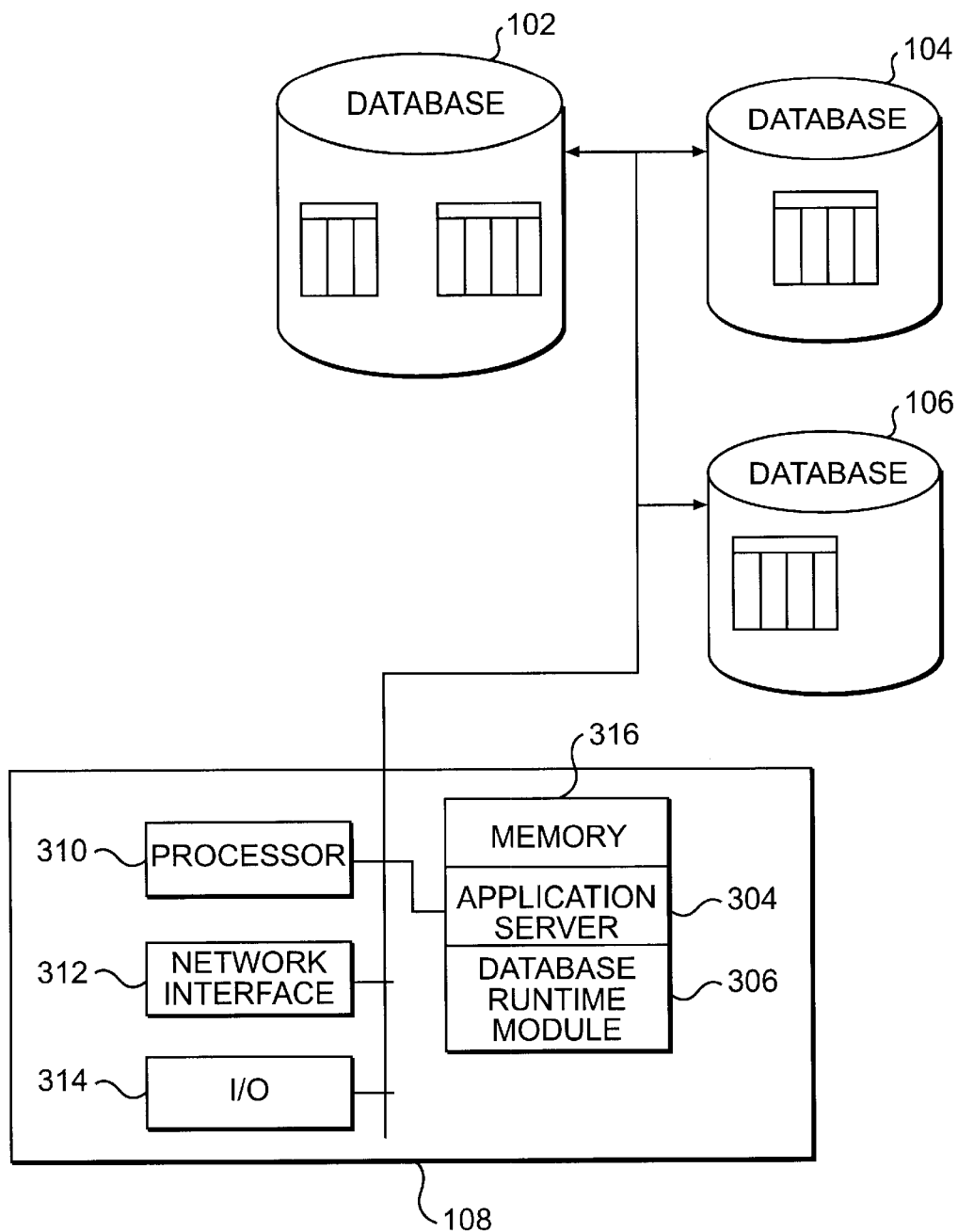
FIG. 3 is a block diagram illustrating the subsystems associated with database server.

FIG. 3 is a block diagram illustrating the subsystems associated with database server 108. Database server 108 includes a processor 310, a network interface 312, I/O 314, and a memory 316. Processor 310 executes instructions associated with applications contained in memory 316 and transmits results to other subsystems in database server 108 over a high speed interconnect or bus. I/O 314 is an interface used to couple database server 108 with devices such as a keyboard, a mouse, a display device, and any other I/0 device useful in operating and managing database server 108.

Memory 316 includes an application server 304 and a database runtime module 306. Application server 304 stored in memory 316 fulfills requests for database access to databases 102, 104, and 106. The database requests are received over network 110 from object-database server 112 in a database language such as SQL. Database runtime module 306 processes the database requests and accesses data in databases 102, 104, and 106.

Figure 4:
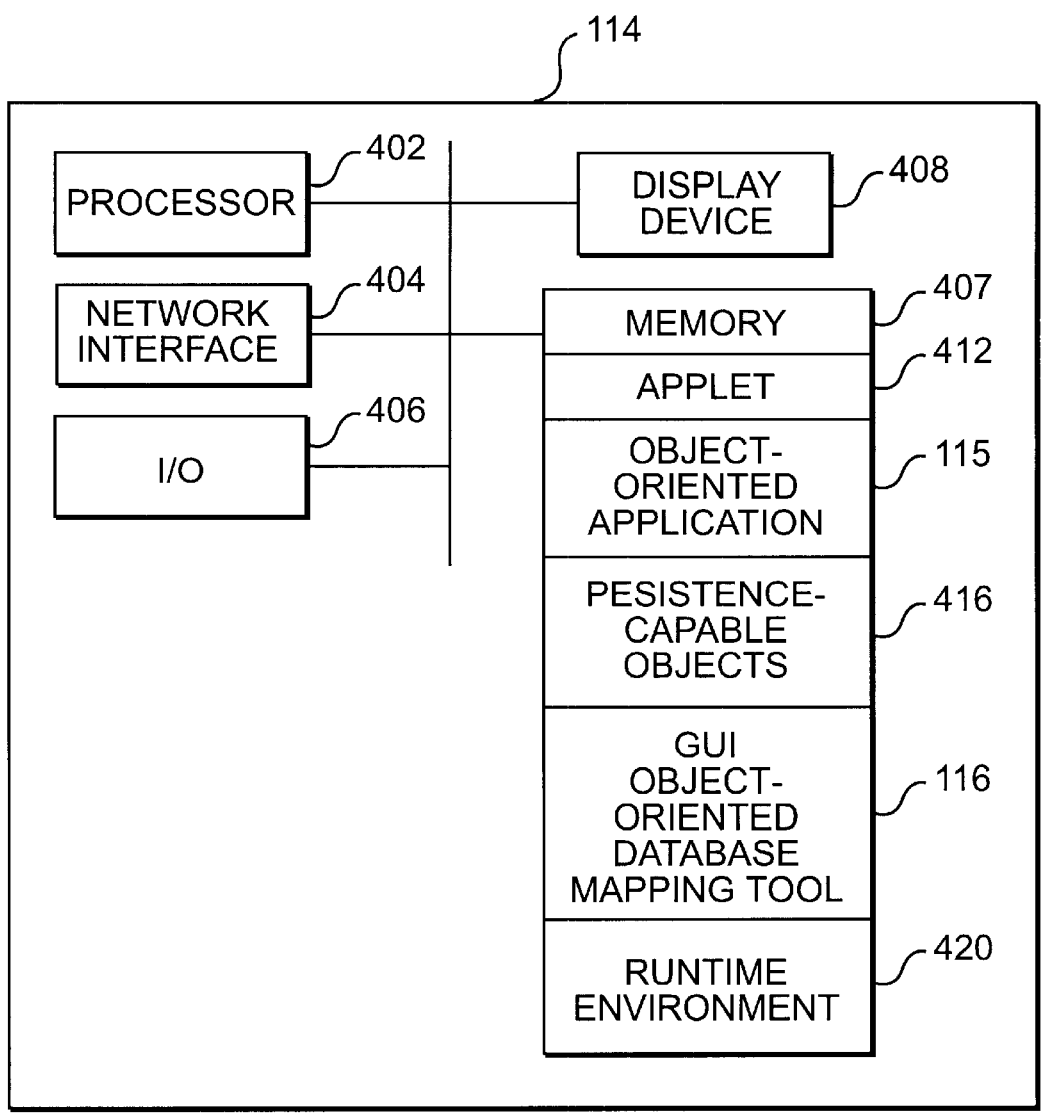
FIG. 4 is a block diagram illustrating the subsystems associated with a client used to access objects stored on a database.

FIG. 4 is a block diagram illustrating the subsystems associated with client 114 used to access objects stored in a database. Client 114 includes a processor 402, a network interface 404 coupled to network 110, an I/O interface 406, a display device 408, and a memory 407 loaded with a number of different software subsystems. These elements operate in a manner similar to the like named elements mentioned above. Display device 408 provides visual feedback to the user making requests to manipulate objects stored in databases 102, 104, and 106. Also, a user can use display device 408 to display and interact with a GUI object-database mapping tool consistent with the present invention.

Memory 407 includes an apple 412, object-oriented application 115, GUI object-oriented database mapping tool 116, one or more persistence-capable objects 416, and runtime environment 420. Runtime environment 420 may include a virtual machine (VM) and a development kit (DK) having class libraries. In one implementation consistent with the present invention, apple 412 includes object-oriented code that accesses tables in a database. Alternatively, application 414 may also use object-oriented code to access tables in a database. Either apple 412 or application 414 generates persistence-capable objects 416. Apple 412 and application 414 may be developed using the Java™ programming language and processed in a Java™ runtime environment (JRE) having a Java™ virtual machine (JVM) and classes from the Java™ Foundation Classes (JFC).

Figure 5:
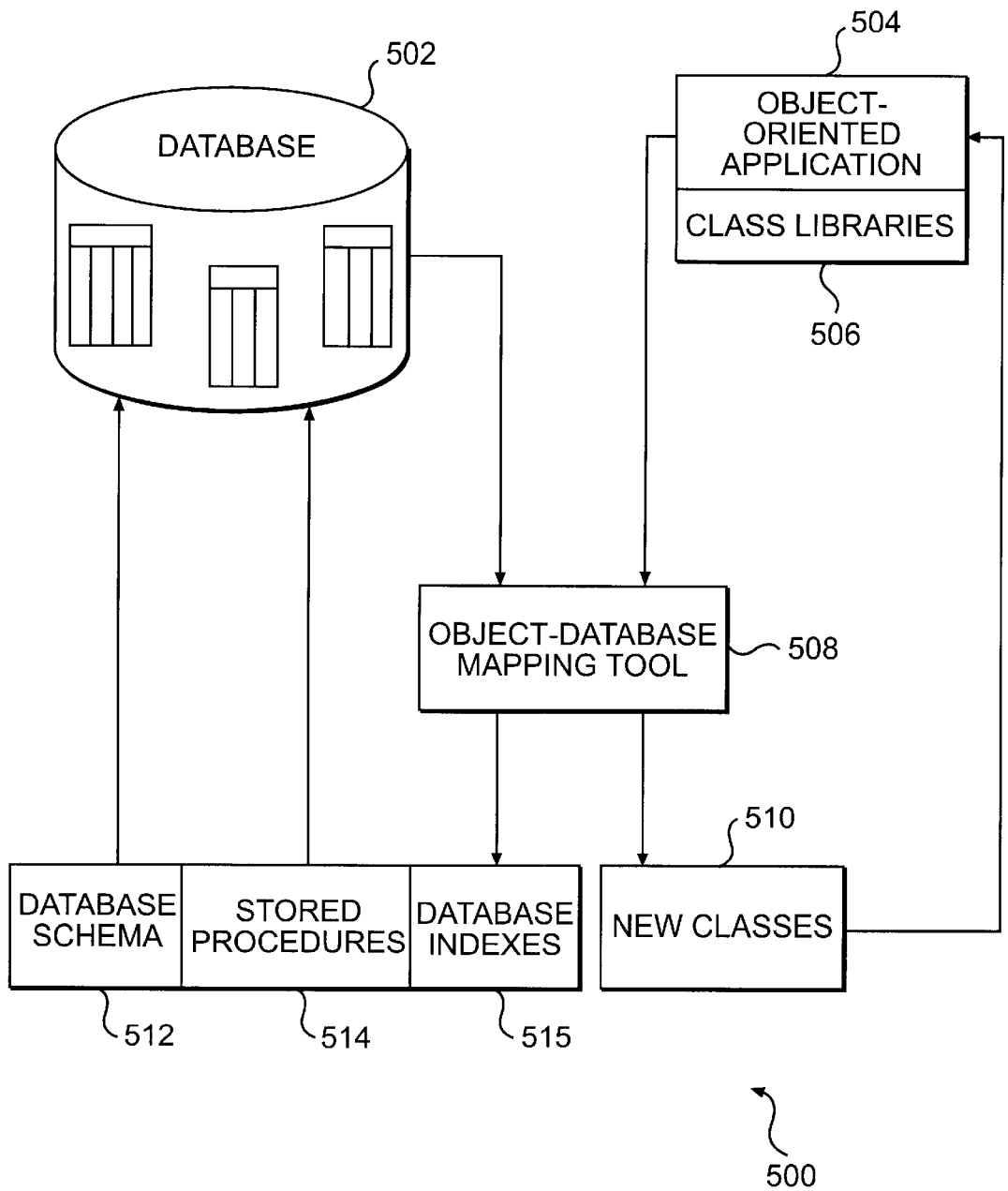
FIG. 5 is a block diagram of an exemplary object-oriented-database system with which systems and methods consistent with the present invention may be implemented.

FIG. 5 is a block diagram of an exemplary object-oriented database system 500 with which systems and methods consistent with the present invention may be implemented. System 500 includes a database 502 having tables to store data associated with objects, an object-oriented application 504, one or more class libraries 506 used to instantiate an object, an object-database mapping tool 508, a database schema 512, stored procedures 514, indexes 515, and numerous new classes 510 generated using object-database mapping tool 508.

In one implementation consistent with the present invention, object-database mapping tool 508, maps tables contained in database 502 into classes. A user provides tool 508 with data stored in tables of database 502. Tool 508 converts the tables into a number of corresponding new classes 510. In one implementation consistent with the present invention, these new classes 510 are integrated with existing class libraries 506.

Tool 508 can also map classes in class libraries 506 into the tables used in database 502. A user provides tool 508 with persistence-capable-compatible classes in class library 506 for mapping to database 502. Object-mapping tool 508 determines how each persistence-capable class in class library 506 is mapped to tables in database 502. During the class-to-database mapping, stored procedures 514, and database indexes 515 are generated and stored in database 502. Database indexes 515 are used to improve access time associated with accessing data associated with objects and stored in database 502. The class-to-database mapping process generates database schema 512 containing code and instructions for generating database tables.

Class-to-Table Mapping

Figure 6:
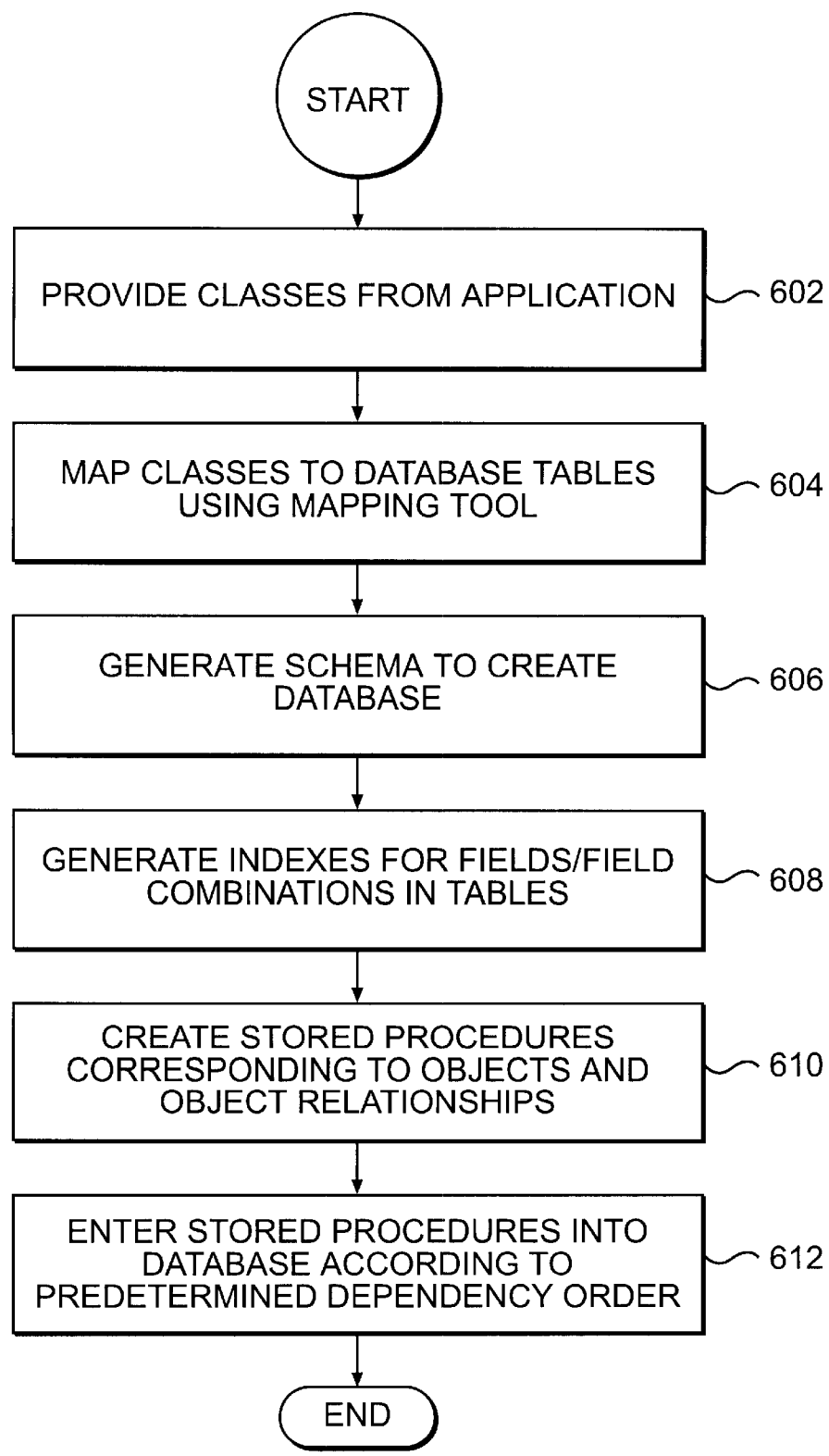
FIG. 6 is a flowchart of a method consistent with the present invention used to translate a class in an object-oriented application to table entries in a database.

FIG. 6 is a flowchart of a method consistent with the present invention used to translate a class in an object-oriented application to table entries in a database. The user begins by providing tool 508 one or more classes corresponding to the objects in an object-oriented application (state 602). These classes have fields, methods, and other operators associated with an object-oriented language. Fields in this context are used to store different types of data or variables and methods are used to manipulate the objects derived from the corresponding classes.

A class hierarchy is also provided in the various classes defined in the object-oriented application. The class hierarchy indicates which classes are superclasses and which classes are subclasses of each other. Methods, fields and other object-oriented characteristics from a superclass are inherited by a subclass. These relationships are used to map classes into database tables and other database structures.

Tool 508 creates tables in the database having rows and columns corresponding to the one or more classes. The tables are created based upon a predetermined class-to-database mapping between classes and tables. In one implementation consistent with the present invention, the class-to-database mapping maps one class in the object-oriented application to one table in the database (state 604). Using the one-to-one class-to-database mapping technique, a class having multiple field entries is mapped to a single table wherein each column corresponds to each of the multiple fields. An additional row is added to the table for each object instance of the class stored in the database. Alternatively, more complex class-to-database mappings can be used to map classes to tables such as mapping a single class to multiple tables or mapping multiple classes to a single table.

Tool 508 generates a schema to create the tables in a database (state 606). A schema includes a description of the tables in a database and their various attributes. A user uses the schema to generate a database. Multiple schemas can be organized as separate entries in a catalogue. The catalogue names each schema with a unique label to distinguish the schemas from each other.

To improve look-up speed and performance, tool 508 allows a user to specify which fields in an object should be indexed in the database for fast access. The fields specified by the user are logically organized by tool 508 in an index group. Tool 508 analyzes each field in the index group specified by the user and generates indexes on tables in the database corresponding to the selected fields (state 608). The index is a data structure that allows rows of tables to be found quickly based on the values of one or more entries in a row. The database selects the best index to improve a query when multiple indexes are defined on the table.

In one implementation consistent with the present invention, tool 508 allows a user to specify if the index group is to be unique or can be non-unique. If a unique index group is specified, tool 508 generates one or more unique indexes for the user. A unique index requires that each row in the table contains a unique value in the specified column. Unique indices are typically faster because only one row entry in the table matches a search.

In contrast, a non-unique index group of fields selected by the user may correspond to one or more non-unique indexes in the database. By selecting a non-unique index group, tool 508 can generate non-unique indexes in the database if necessary. In contrast to the unique indexes, the non-unique indexes can contain duplicate value entries in the corresponding columns. Typically, the non-unique indexes are slower when the database has to distinguish between two or more rows with common column entries.

Tool 508 also creates one or more stored procedures 514 corresponding to operations typically performed on objects in the object-oriented application (state 610). Tool 508 automatically creates stored procedure 514 to provide basic operations useful for retrieving data stored in the database. For example, stored procedures 108 can be generated to perform routine operations on objects such as Add, Delete, Modify and Retrieve.

Stored procedures 514 are entered into the database in a predetermined dependency order. If a first stored procedure calls a second stored procedure, the second stored procedure must be defined first in the database. The dependency order ensures that a stored procedure is defined in the database before it is called by an application or other stored procedure. In one implementation consistent with the present invention, the order the stored procedures are stored in the database depends on the class hierarchy and the relationships between stored procedures (state 612).

Figure 7:
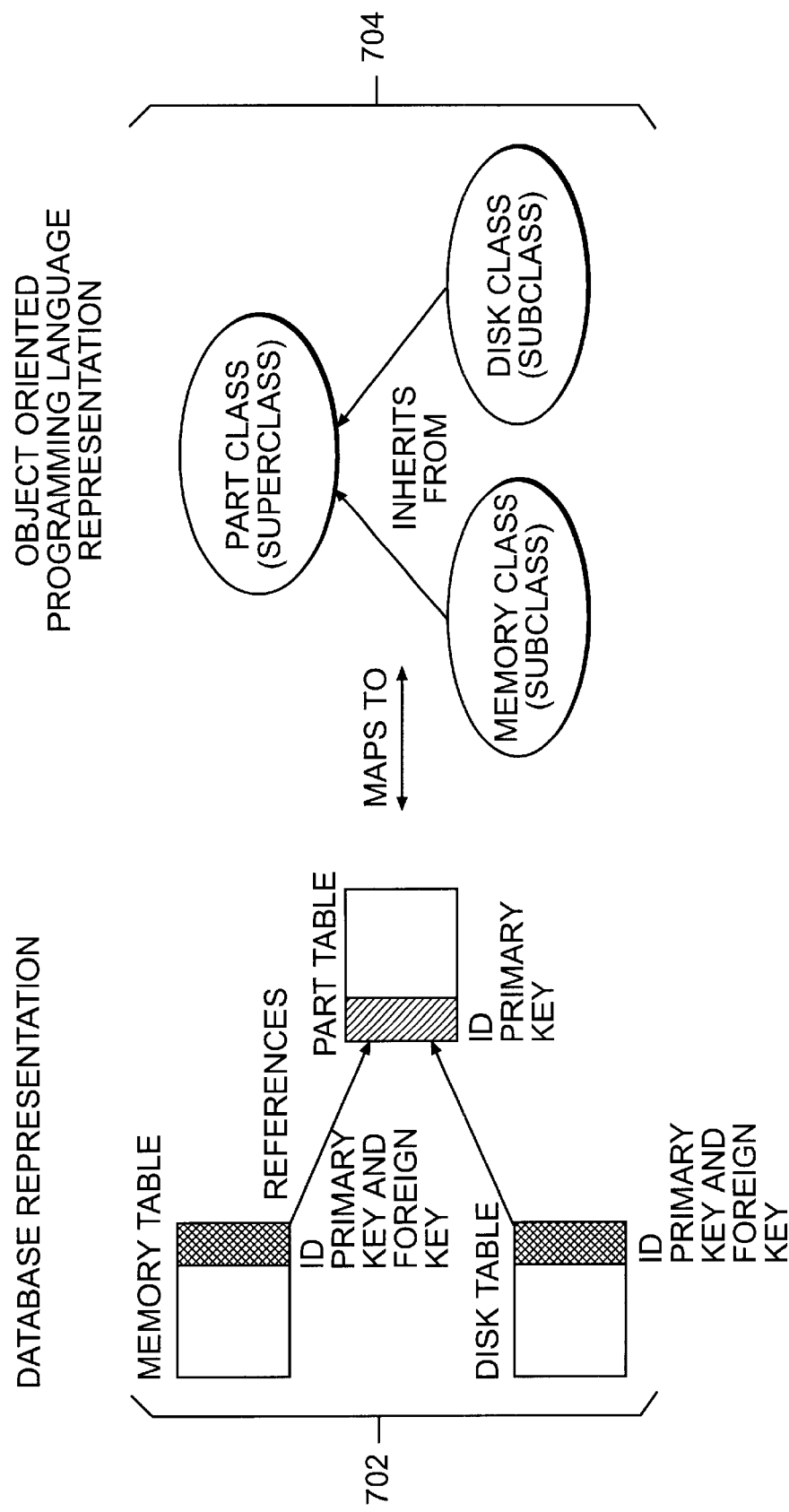
FIG. 7 is a block diagram showing superclass-subclass table and object relationships.

FIG. 7 is a block diagram showing how object relationships are mapped to table relationships in a database. A superclass-subclass object relationship 704 is modeled in the database using foreign keys and primary keys as indicated in a corresponding superclass-subclass table relationship 702. In this example, assume an object-oriented application has a set of classes including a part class, a memory class and a disk class. The memory and disk classes are subclasses of the part class as shown in superclass-subclass object relationship 704. Because the memory and disk classes are subclasses they inherit methods, fields, and, interfaces of the part class. The memory and disk classes also may extend the parts class to define certain unique aspects of the memory and disks classes.

To represent the superclass-subclass class relationship 704, the database uses a superclass-subclass table relationship 702. Essentially, a first table is a subclass of a second table by specifying that the primary key of the first table is also a foreign key that references the primary key of the second table. In this case, the first table stores each instance of the disk class and contains a column having a primary key that is also a foreign key to the primary key in the part table. Likewise, the table used to store each instance of the memory class contains a column having a primary key that is also a foreign key to the primary key in the part table. These tables maintain referential integrity in the database when objects are added or deleted. For example, if a part object is deleted, the superclass-subclass table relationship 702 requires that entries in the memory table and disk table are deleted as well.

Figure 8:
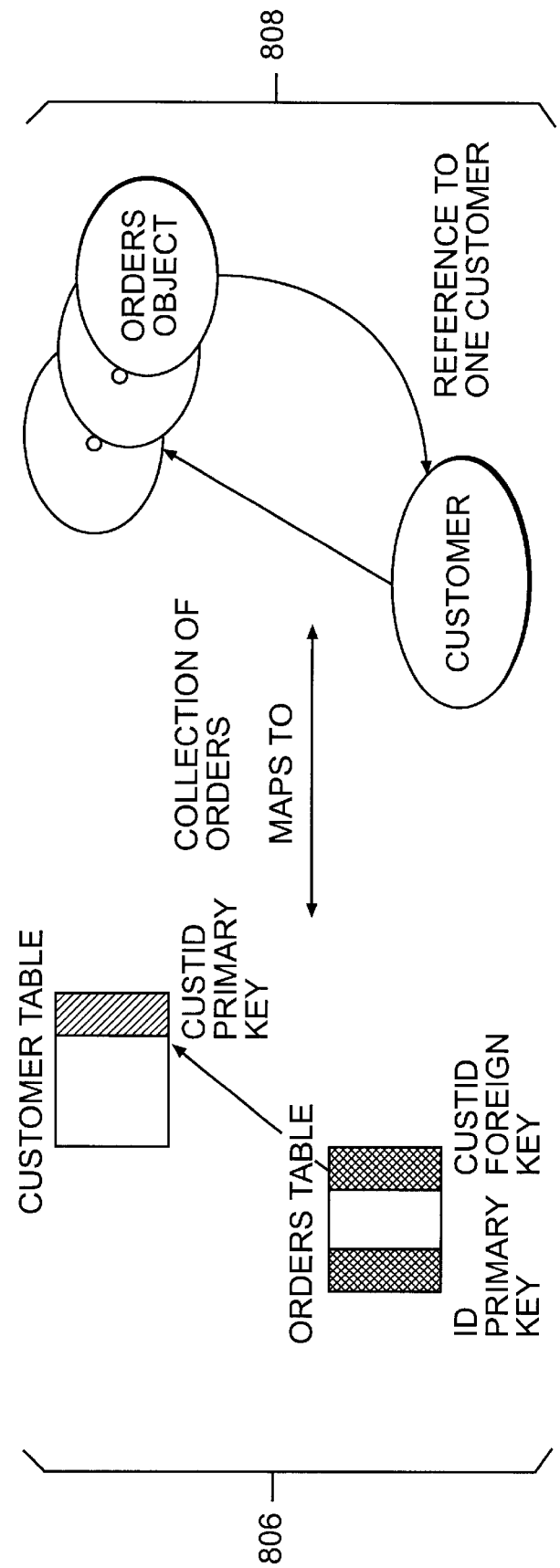
FIG. 8 is a block diagram showing a one-to-many table and one-to-many object relationship.

In addition to preserving class hierarchy, foreign keys and primary keys can also be used represent the one-to-many relationships between classes. FIG. 8 illustrates a one-to-many class relationship 808 and a one-to-many table relationship 806. For example, one-to-many class relationships 808 allows a customer object to have many order objects but each order object can only be associated with one customer object. The customer class in one-to-many class relationship 808 has a field in the class that references multiple order objects. Each order object has a field that contains a single reference to a particular customer object.

The corresponding one-to-many table relationship 806 includes an orders table having a customer identification (CUSTID) primary key column entry and a separate CUSTID foreign key column. The customer table includes a CUSTID primary key which is unique for each customer in the system. This mechanism ensures referential integrity in the object representation in the database. A deletion of a customer from the database also requires a deletion of that customer's corresponding orders in the order table based upon the CUSTID foreign key. However, deleting an order from the order table does not require a deletion of the corresponding customer from the customer table.

Figure 9:
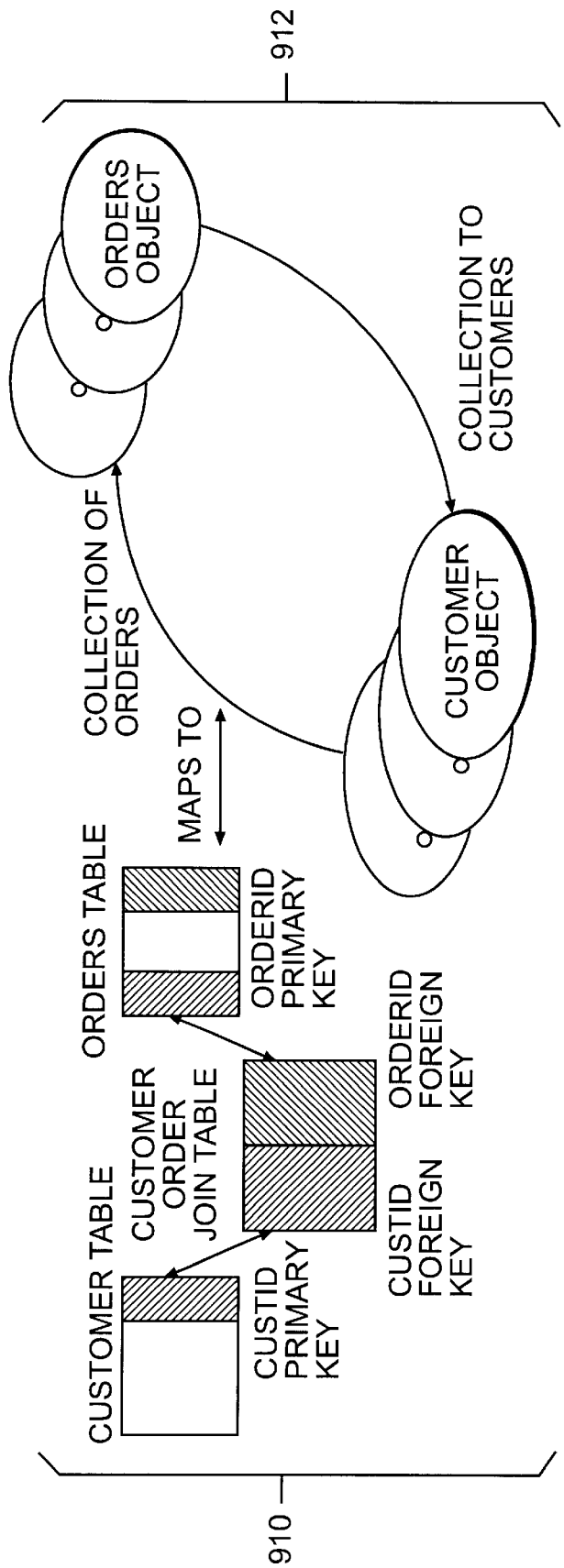
FIG. 9 is a block diagram showing a many-to-many table and a many-to-many object relationship.

FIG. 9 illustrates how foreign keys and primary keys are used to represent a many-to-many class relationship 912 and many-to-many table relationship 910. Assume a customer object can reference multiple order objects and orders can be from multiple customers. The many-to-many class relationship 912 is represented in the database using a join table as shown with many-to-many table relationship 910. The join table is an intermediary table that is used to form the association between the entities in the two tables. A join table generally has two sets of columns. One set of columns forms a foreign key reference to the primary key in one table. The other set of columns forms the foreign key reference to the primary key in the other table. In this example, a customer order join table has a CUSTID foreign key mapped to a CUSTID primary key in a customer table and an ORDERID foreign key mapped to an ORDERID primary key in an orders table respectively.

Table-to-Class Mapping

Figure 10:
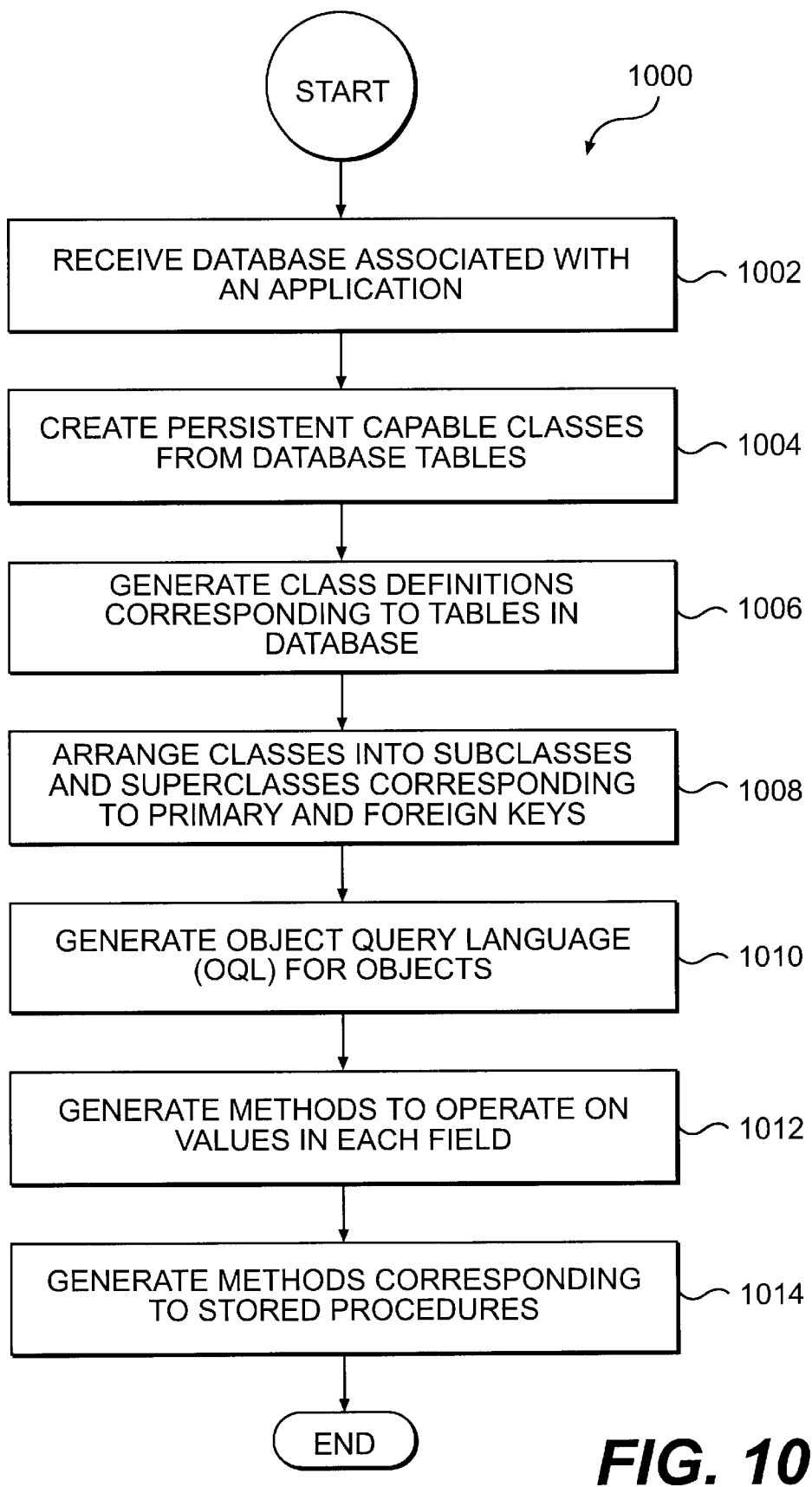
FIG. 10 is a flowchart of a method consistent with the present invention used to convert tables in a database into classes in an object-oriented application.

Tool 508 also includes a table-to-class mapping method to transform tables in a database to one or more classes in an object-oriented language. FIG. 10 is a flowchart of a method consistent with the present invention used to convert tables and other information in a database into classes in an object-oriented application. Initially, the user provides the database, and any other useful information such as stored procedures, indexes, and SQL routines related to the database, to tool 508 (state 1002). Tool 508 uses the mapping process to create persistence-capable classes from tables in the database (state 1004). In one implementation, tables in the database correspond to persistence-capable classes capable of storing objects after applications referencing the objects have completed executing.

Tool 508 generates class definitions corresponding to each table in the database (state 1006). Tool 508 analyzes relationships between tables to determine if there is a superclass-subclass relationship between tables, a one-to-many relationship between tables, or a many-to-many relationship between tables. FIGS. 7–9 outlines database table relationships and how they translate into corresponding class relationships in an object-oriented application.

A table-to-class mapping technique used to convert a table into a class is the inverse process of the class-to-table mapping technique discussed above. Tool 508 arranges the classes into the appropriate superclass and subclasses based on how foreign keys and primary keys are used in a table (state 1008). Essentially, a subclass is generated from a table that contains a column that has both the primary key for the subclass table and also a foreign key to a superclass table. For example, in FIG. 7 a superclass-subclass table relationship 702 includes a disk table having a column entry which is a primary key in the disk table column as well as a foreign key to a part table. In this example, the disk table is considered a subclass of the part class.

With respect to indexes, tool 508 uses the existing indexes in the original database and does not create more indexes unless the user specifically requests them in the table-to-class mapping.

Tool 508 also generates object query language (OQL) routines for use by objects generated from a particular classes (state 1010). The OQL routines allow a user to query objects using an object-oriented programming language interface. The OQL routines understand the relationships between classes and can do referential navigation without requiring the user to make explicit databases operations. For example, a query on a particular class will return all objects in that class as a connection of objects which match the query criteria. Users can then iterate through the collection of objects and operate on the individual objects. Alternative methods other than OQL may also be used to access objects in the database.

Tool 508 also generates default methods to operate on each field in a class (state 1012). A "get" method is created to get a field value stored in a persistent object in the tables of a database. Similarly, a "set" method is used to set a value in each field of a persistent object also stored in the database. These methods enable a user to utilize methods in an object-oriented programming language to manipulate field values in persistent objects. Alternative implementations can include different default methods as necessary for the particular application or set of applications being developed.

Tool 508 may also generate object-oriented methods corresponding to other stored procedures located in the database (state 1014). These object-oriented methods enable an object-oriented application to access precompiled stored procedure routines stored in the database.

Object-Database Mapping Tool Graphical User Interface

Figure 11:
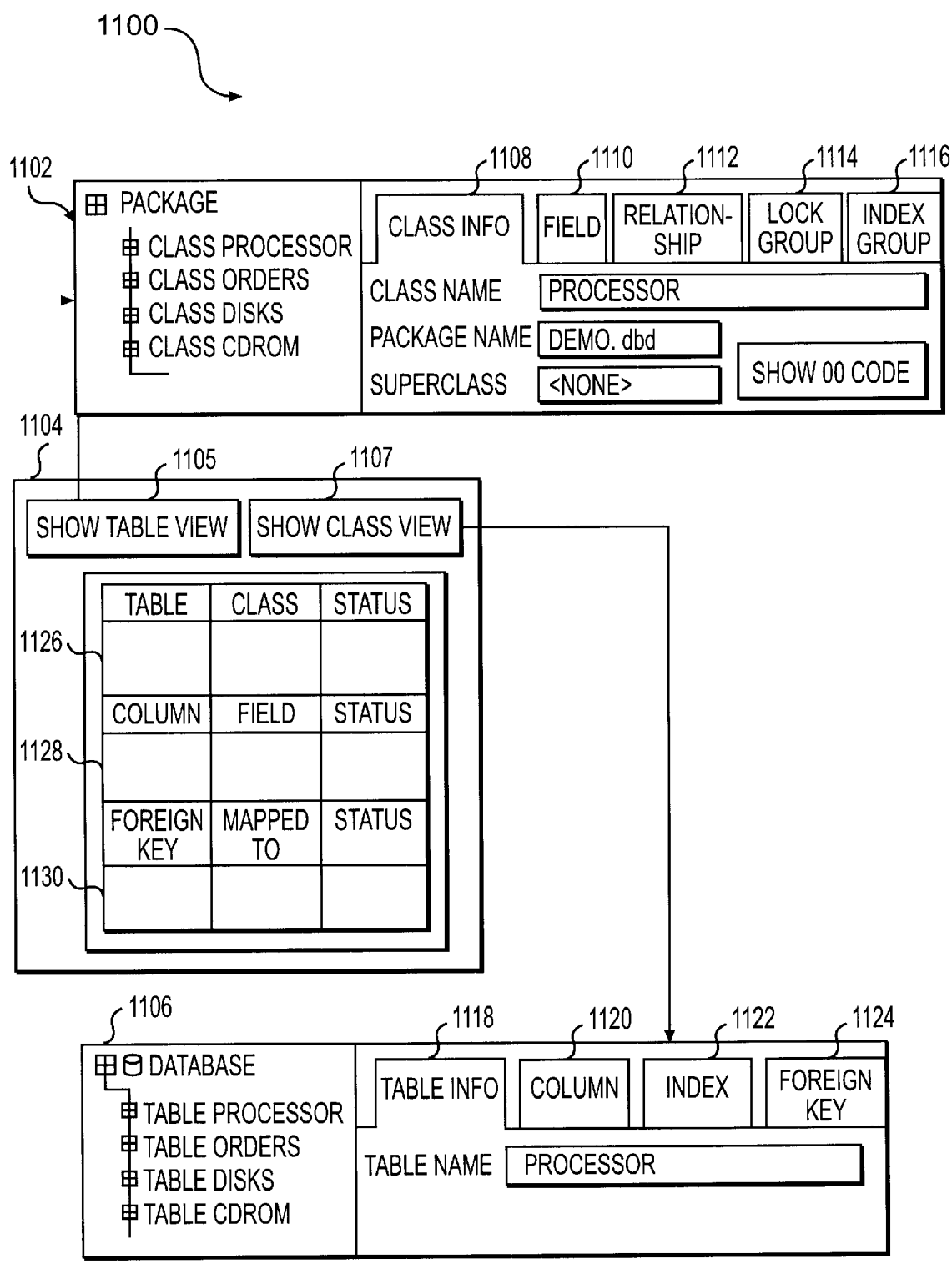
FIG. 11 is a block diagram showing a graphical user interface consistent with the present invention for use with an object-database mapping tool.

FIG. 11 is an exemplary graphical user interface (GUI) 1100 for use with an object-database mapping tool. GUI 1100 enables a user to view changes to either a database or an object-oriented application using an integrated user interface. GUI 1100 enables a user to visualize the mapping of a database to objects and classes in an object-oriented application. The user can also use GUI 1100 to visualize the mapping of an object-oriented application to a corresponding database and respective tables.

GUI 1100 includes a class view 1102, a table view 1106, and a combination table-and-class view 1104. Class view 1102 and table view 1106 display information in a hierarchical tree and selectable tabular interface. In one implementation consistent with the present invention, a user selects an element in the hierarchical tree and selects a tab in the tabular interface to provide additional details corresponding to the element.

Class view 1102 shows packages with corresponding information for classes, fields, relationships, and lock groups in a hierarchical tree format in the left portion of the window. The package is a logical grouping of classes and related information. The tabular interface displays details of class view 1102 using a class info tab 1108, a field tab 1110, a relationship tab 1112, a lock group tab 1114, and an index group tab 1116.

A similar interface is also used to show the structure and information stored in the database tables. In one implementation consistent with the present invention, table view 1106 displays database and tables in a hierarchical tree format in the left portion of the window. The corresponding tabular interface displays details of table view 1106 using a table info tab 1118, a column tab 1120, an index tab 1122, and foreignkeytab 1124.

Figure 12:
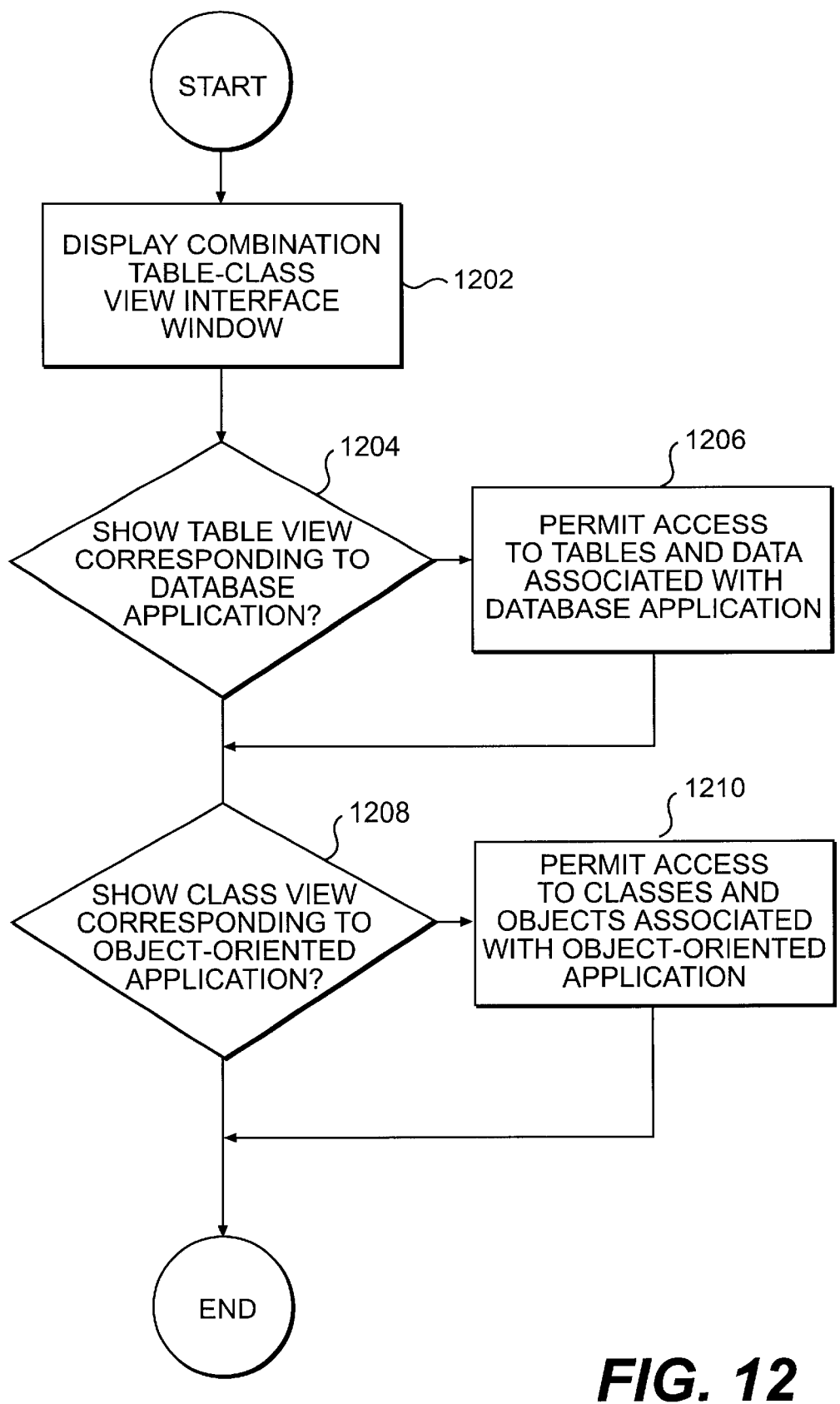
FIG. 12 is a flowchart of the method used by a graphical user interface consistent with the present invention to display information associated with an object-mapping tool.

FIG. 12 illustrates a method used by interface 1100 to display information associated with an object-mapping tool. In one implementation consistent with the present invention, interface 1100 is displayed on the display device of a computer or other computer based device. Initially, interface 1100 displays a combination table-and-class view interface in a window on the display device (state 1202). This window includes database elements associated with the database including database names, table names, column names, and foreign key names. Interface 1100 also displays object-oriented elements associated with the object-oriented application and corresponding to the database elements. These object-oriented elements include packages, classes, field names, and relationships.

In one implementation consistent with the present invention, combination table-and-class view interface enables the user to display additional information associated with the object-oriented application and the database. The user selects a show-table-view button 1105 to show a view of tables corresponding to the database (state 1204). The table view permits access to tables and database information associated with the database application (state 1206).

The user selects a show-class-view button 1107 to show a view of classes corresponding to the object-oriented-application (state 1208). The class view permits access to classes and objects associated with the object-oriented application (state 1210).

Figure 13:
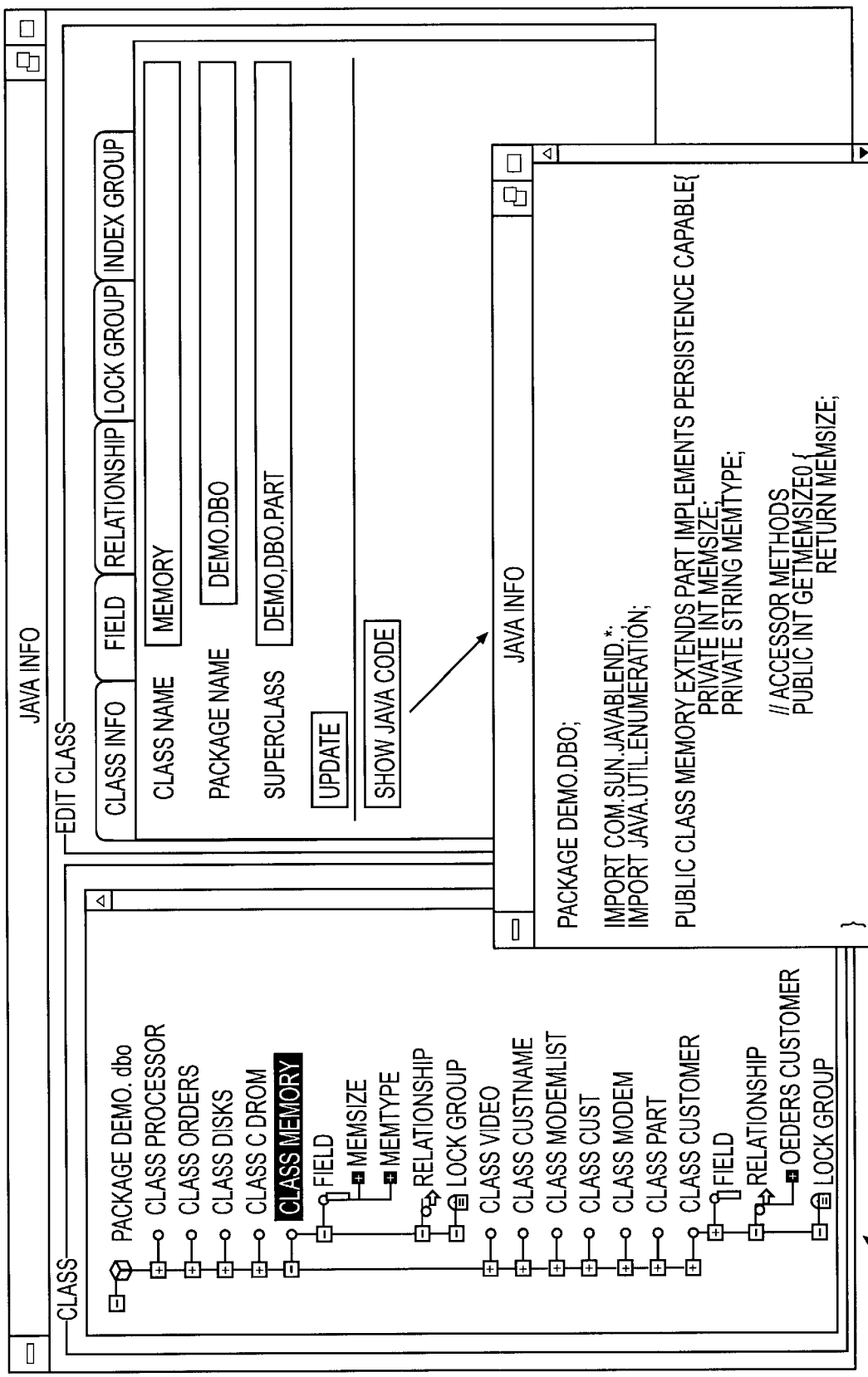
FIG. 13 is an exemplary screen display displaying class information in a manner consistent with the present invention.

FIG. 13 is an exemplary screen display that displays class information when the user selects class info tab 1108 in a manner consistent with the present invention. Class information displayed includes the name of the class, a package the class is associated with, a superclass the class is associated with if any, and the object-oriented code corresponding to the class. An update button commits any changes a user makes to the class information.

Figure 14:
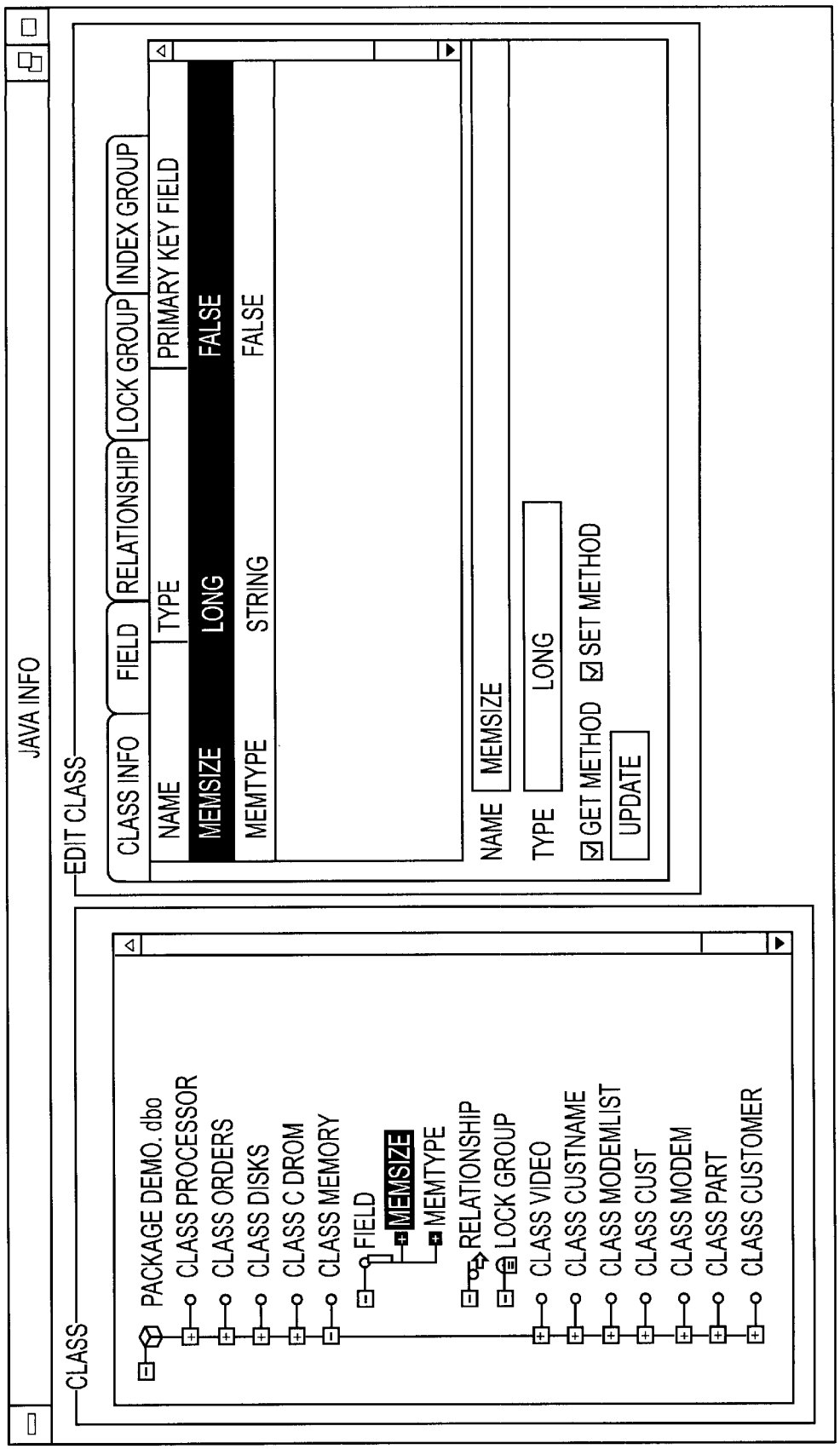
FIG. 14 is an exemplary screen display displaying field information in a manner consistent with the present invention.

FIG. 14 is an exemplary screen that displays field information when the user selects field tab 1110 in a manner consistent with the present invention. Field information displayed includes the name of each field in the class, the type of each fields such as double, long, float, and string, and if the field is a primary key field. An update button commits any changes a user makes to the field information.

Figure 15:
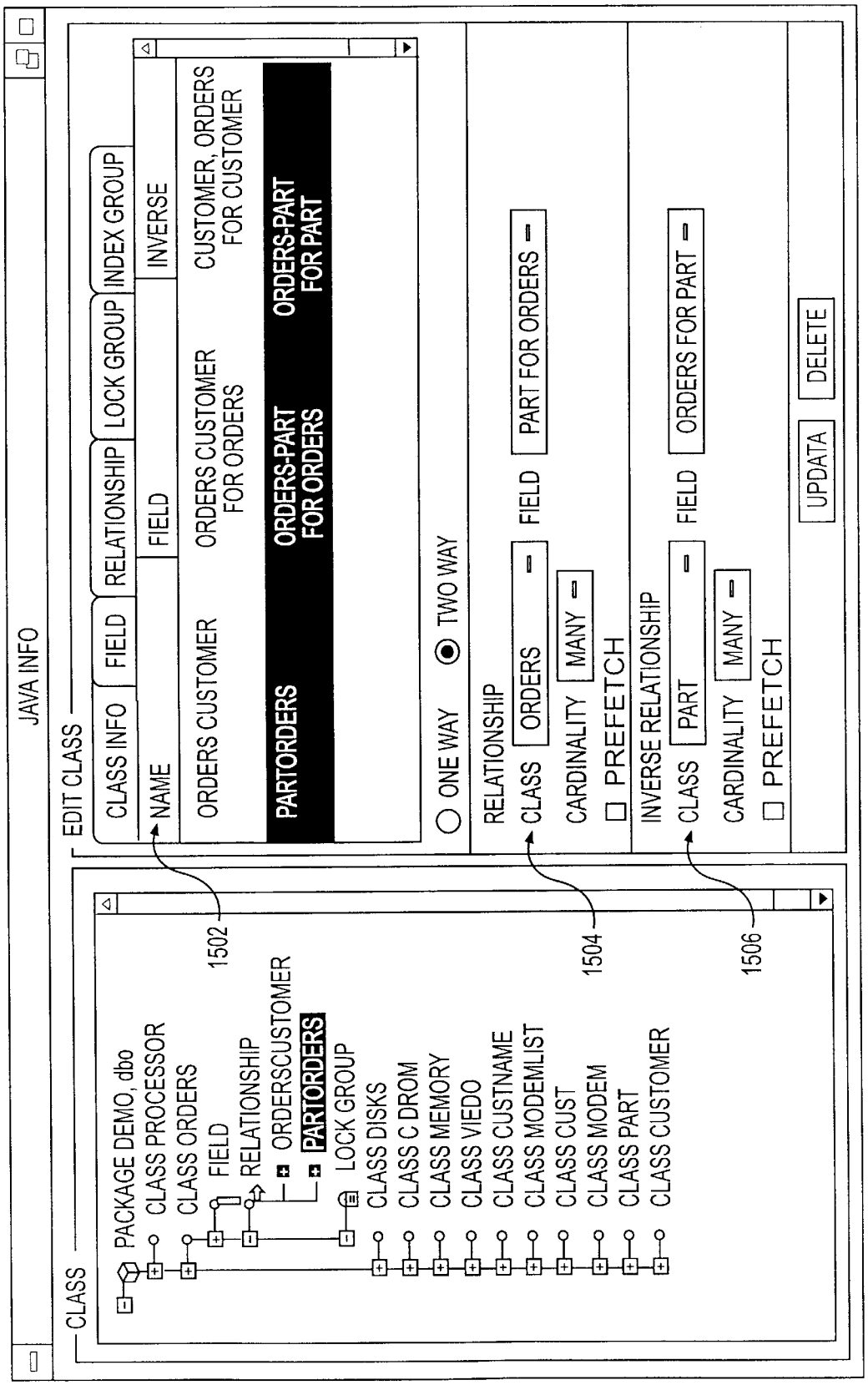
FIG. 15 is an exemplary screen display displaying relationship information in a manner consistent with the present invention.

FIG. 15 is an exemplary screen display that displays relationship information when the user selects a relationship tab 1112 in a manner consistent with the present invention. Relationship information displayed includes a list of relationships 1502, a relationship detail 1504, and an inverse relationship detail 1506 Each relationship in the list of relationships 1502 includes the name of the relationship, a first field associated with a first class, and a second inverse field associated with a second class.

The user can specify that a relationship is two-way relationship in list of relationships 1502. Two-way relationships allows two objects to access each other's information. For example, an object-oriented application uses the first class to access data in the second class using the first field and can also use the second class to access data in the first class using the second inverse field. A one-way relationship only allows a first class to access data in a second class and but not vice-versa. Relationship detail 1504 displays the class and field of the first class as well as the cardinality between classes such as many-to-many, one-to-many, or one-to-one. Similarly, inverse relationship detail 1506 displays the class and field of the second class as well as the cardinality between classes.

Figure 16:
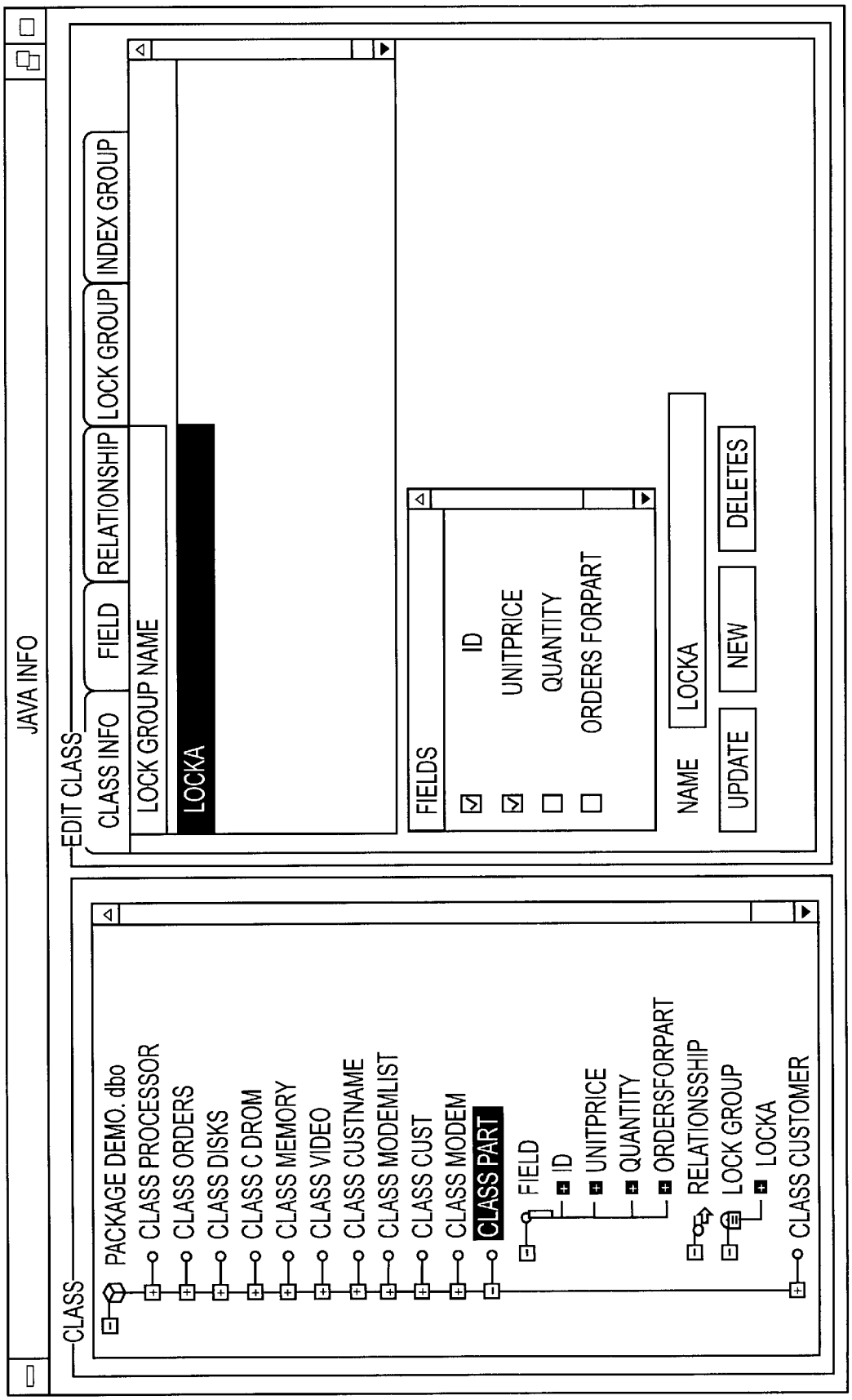
FIG. 16 is an exemplary screen display displaying lock group information in a manner consistent with the present invention.

FIG. 16 is an exemplary screen display that displays lock group information when the user selects lock group tab 1114 in a manner consistent with the present invention. Lock group information displayed includes related fields in a class which are interdependent. A user specifies lock groups to designate related fields within an object and optimize concurrent access to the underlying database. Lock group tab 1114 allows a user to create a new lock group, change the name of an existing lock group, and change the fields that make up a lock group.

Figure 17:
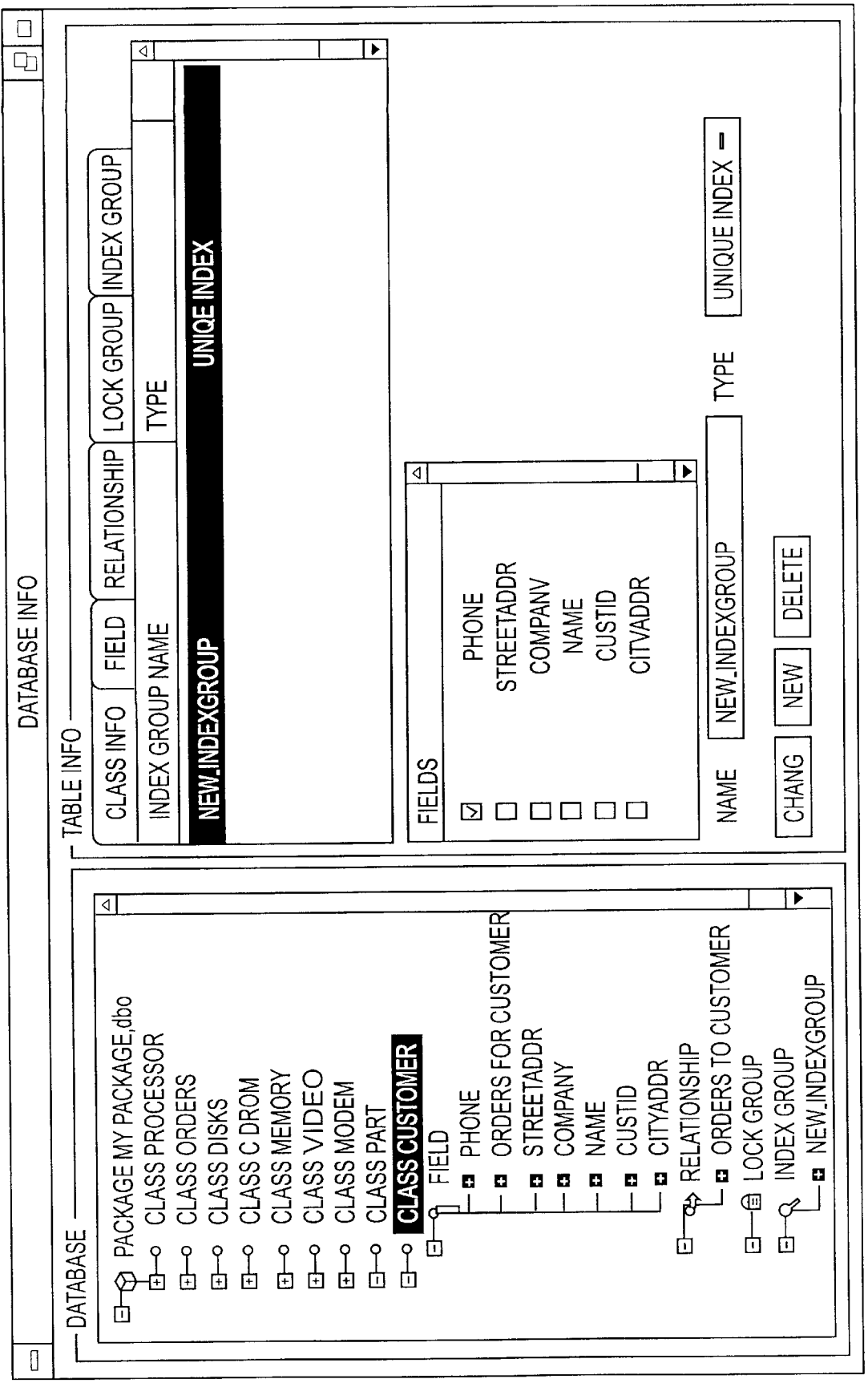
FIG. 17 is an exemplary screen display displaying index group information in a manner consistent with the present invention.

FIG. 17 is an exemplary screen display that displays index group information when a user selects index group tab 1116 in a manner consistent with the present invention. Index group information displayed includes index group name, type of index group (e.g. unique or non-unique), fields in index, and name of index. Index group tab 1116 enables a user to view, create, and edit an index group. The user creates index groups by selecting fields in a class for indexing. Index groups are used to index columns in tables corresponding to the fields. The indexed columns increase the underlying database search efficiency.

Index group tab 1116 allows a user to select whether an index group is unique or non-unique. The unique index group requires that each object is unique in at least the fields specified in the index group. A non-unique index group can contain objects with identical data in the fields specified in the index group. The former unique index groups tend to increase searching performance more than the latter non-unique index groups.

Figure 18:
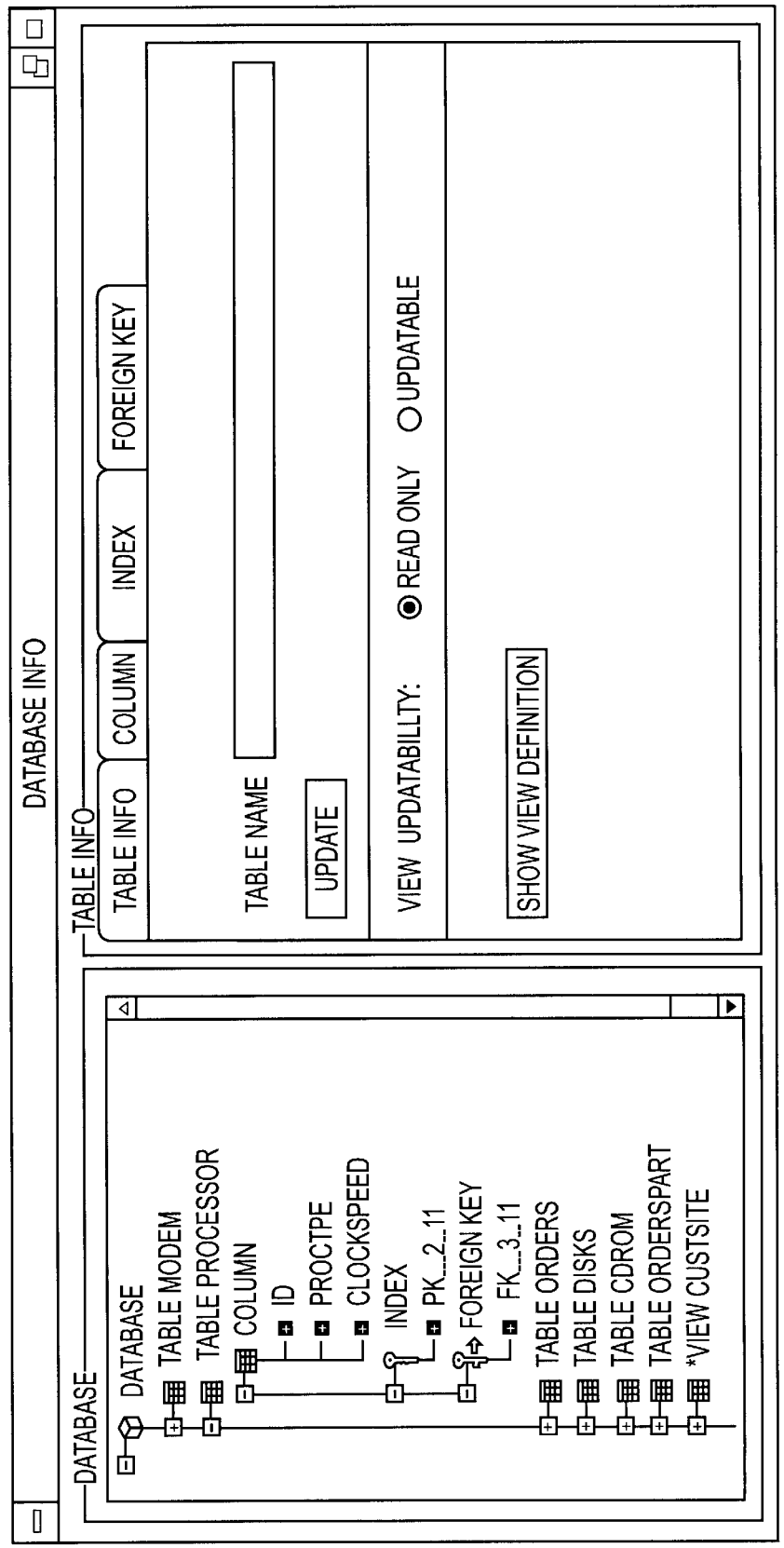
FIG. 18 is an exemplary screen display displaying table information in a manner consistent with the present invention.

FIG. 18 is an exemplary screen display that displays table information when the user selects table info tab 1118 in a manner consistent with the present invention. Table information includes the name of a table and a button for showing a view definition. The view definition allows a user to see the database instruction used to preview information in the table. Table info tab 1118 display enables a user to edit and change the name of a table and change the database instructions to extract data.

Figure 19:
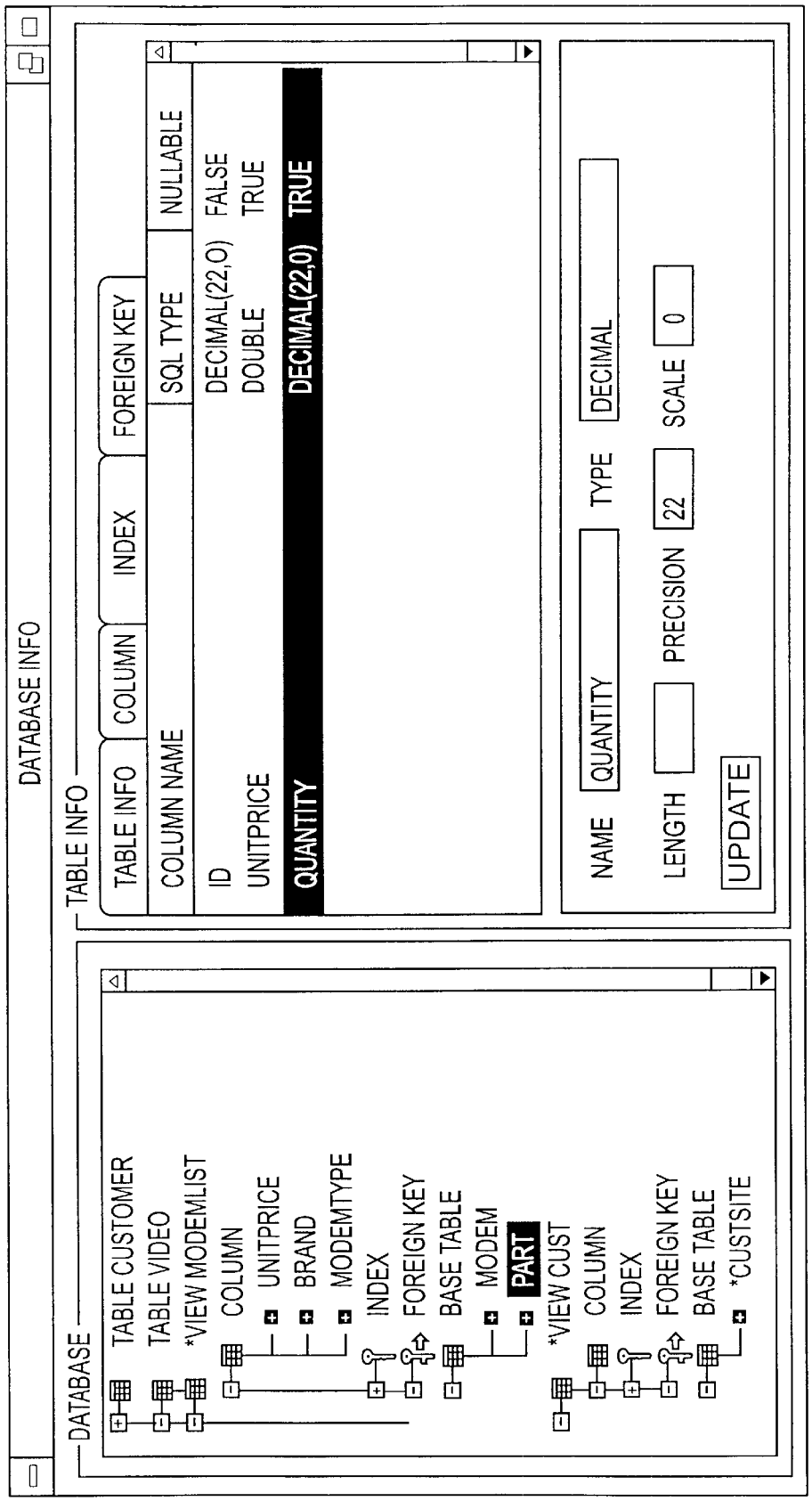
FIG. 19 is an exemplary screen display displaying column information in a manner consistent with the present invention.

FIG. 19 is an exemplary screen display that displays column information when the user selects column tab 1120 in a manner consistent with the present invention. Column information includes the name of a column, the type of database data the column can hold such as long, int, float, or string, the length of the column data if the column holds character data, and the precision and scale of column data if the column holds numeric data. Column tab 1120 enables a user to edit and change the name of a table, the length of characters in the table, and the precision of a numeric data in the column.

Figure 20:
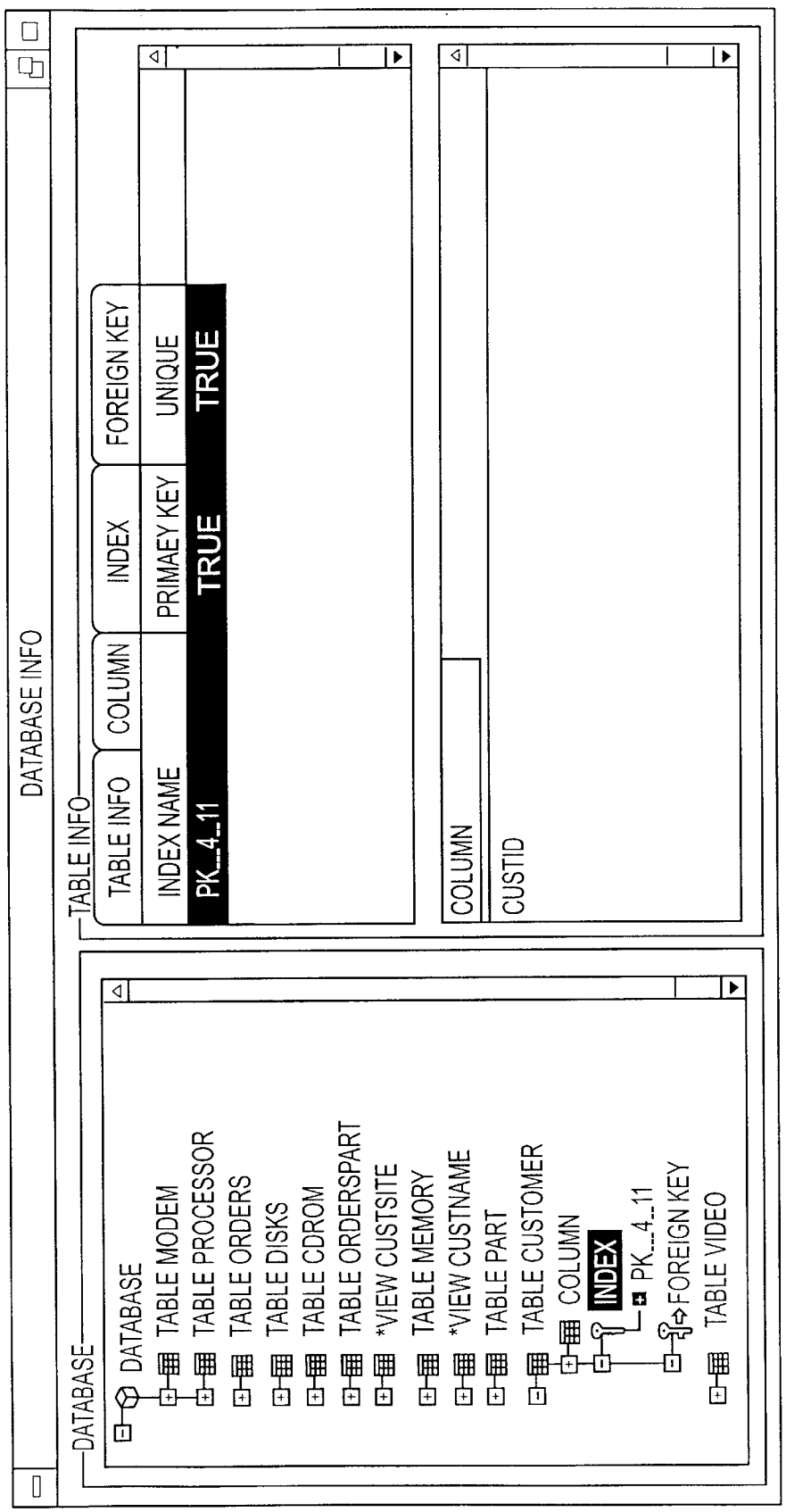
FIG. 20 is an exemplary screen display displaying index information in a manner consistent with the present invention.

FIG. 20 is an exemplary screen display that displays index information when the user selects index tab 1122 in a manner consistent with the present invention. The index information displays indexes generated on columns of tables in a database. In one implementation consistent with the present invention, index tab 1122 displays the index name, whether the index is a primary key, whether the index is unique or non-unique, and the column associated with the index.

Figure 21:
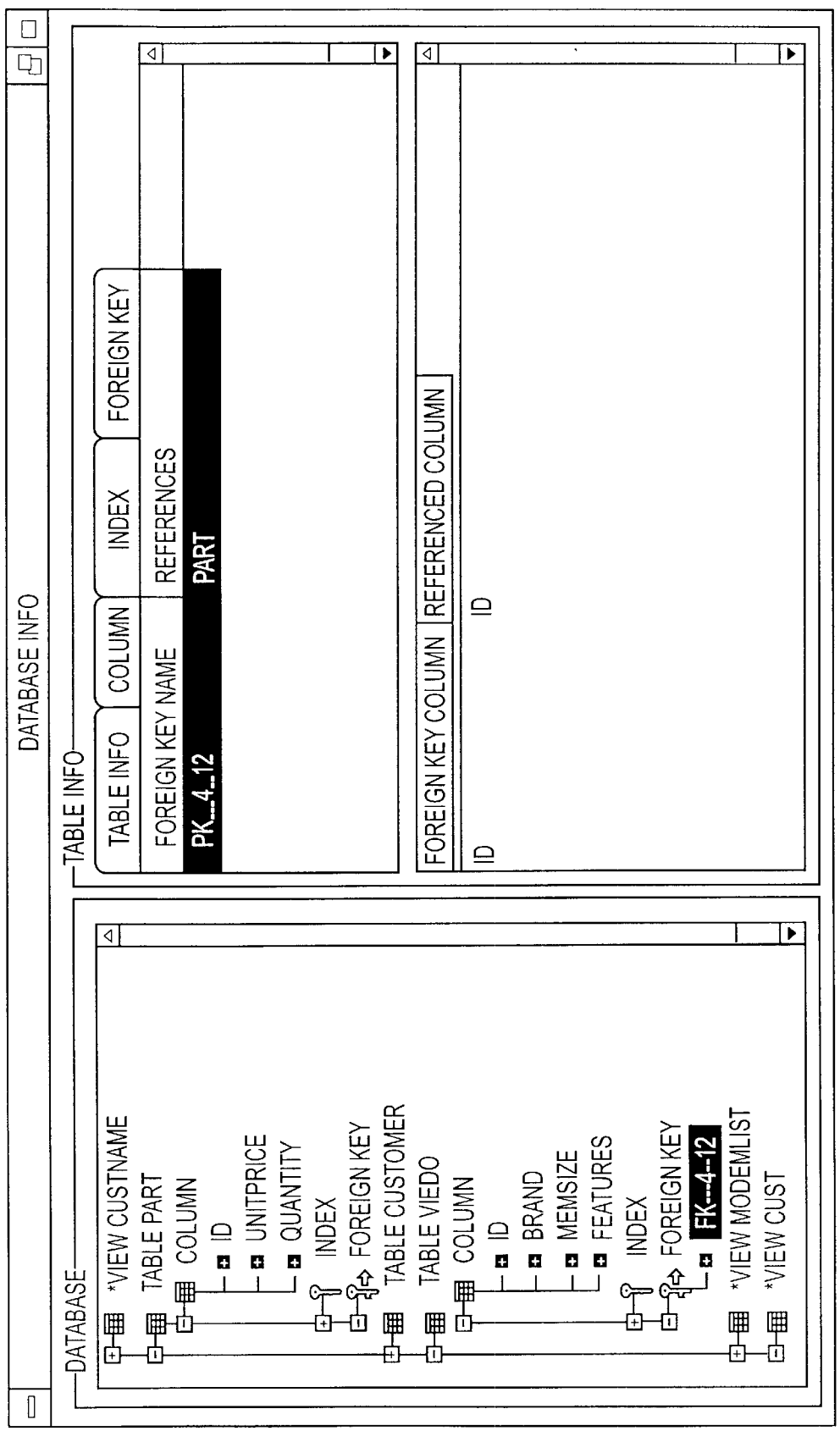
FIG. 21 is an exemplary screen display displaying foreign key information in a manner consistent with the present invention.

FIG. 21 is an exemplary screen display with the foreign key information displayed when the user selects a foreign key tab 1124 in a manner consistent with the present invention. Foreign key information describes foreign keys corresponding to a selected table. In one implementation consistent with the present invention, foreign key tab 1124 displays a foreign key name and the table that the foreign key references in the top portion of the window. The lower portion of the window displays the foreign key column and the name of the column in the referenced table.

In FIG. 11, combination table-and-class view 1104 enables the user to visualize the correspondence between tables in a database and classes in the object-oriented application. Information in table-and-class view 1104 includes show-table-view button 1105, show-class-view button 1107, a table-class mapping 1126, a column-field mapping 1128, and a foreign key-relationship 1130.

A user selects a table in table-class mapping 1126 to show which class has been mapped to a particular table in the database. The status corresponding to the table-class mapping 1126 can be either mapped or unmapped. Mapped indicates that all tables in a database are translated into a corresponding class or classes. If a table is unmapped, the table is not translated to a class in the object-oriented application. A user may exclude a table from being mapped into a class by indicating the table should be unmapped. The user can unmap certain tables from being translated into classes when certain data types in a database do not translate into a corresponding field in an object.

Selecting a table also causes column-field mapping 1128 to display the columns associated with a table and corresponding fields associated with the class. The user can modify the status fields in these areas as mapped or unmapped for similar reasons discussed above as it applies to columns in tables and fields in classes.

If a foreign key is being used in the selected table, foreign key-relationship mapping 1130 identifies the foreign key and the relationship the foreign key creates between two or more classes. For example, a foreign key between the disk table and the part table discussed above in FIGS. 7-9 indicates a disk class is a subclass of a part class and inherits fields, method, and other object-oriented characteristics of the part class. The user can modify the status fields in these areas as mapped or unmapped for similar reasons discussed above as it applies to columns in tables and fields in classes. For example, users may umnap a foreign key in a table to ignore class hierarchy or class relationships when the tables are used to generate classes.

While specific implementations have been described herein for purposes of illustration, various modifications may be made without departing from the spirit and scope of the invention. Those skilled in the art understand that the present invention can be implemented in a wide variety of software platforms and is not limited to the Java™ object oriented programming language and development environment. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. A method, performed on a computer system, for displaying classes associated with an object-oriented application and tables associated with a database, comprising:

selectively displaying a class view corresponding to classes associated with an object-oriented application and corresponding to tables associated with the database, the displaying further comprising:

displaying a hierarchical tree representing a set of object-oriented elements corresponding to the object-oriented application; and providing the set of the object-oriented elements in the hierarchical tree selected from a group including a package name, a class name, a field name, a relationship name, a lock group name, and an index group name;

permitting access to the classes using the displayed class view;

selectively displaying a table view corresponding to tables associated with a database and corresponding to classes associated with the object-oriented application; and permitting access to the tables using the displayed class view.

2. The method of claim 1 further comprising:

displaying a combination table-and-class view corresponding to database elements associated with the database and object-oriented elements associated with the object-oriented application.

3. The method of claim 2 wherein displaying a class view further comprises:

displaying a column database element and a field object-oriented element.

4. The method of claim 2 wherein displaying a class view further comprises:

displaying a foreign key database element and a reference object-oriented element.

5. The method of claim 1 wherein displaying a class view further comprises:

displaying a tabular interface having a tab corresponding to each element in a set of object-oriented elements.

6. The method of claim 5 wherein displaying the tabular interface further comprises:

providing a set of entry fields that facilitates operating on characteristics associated with each element in the set of object-oriented elements.

7. The method of claim 1 wherein displaying a table view further comprises:

displaying a hierarchical tree representing a set of database elements associated with a set of tables corresponding to the database.

8. The method of claim 7 wherein displaying a hierarchical tree further comprises:

providing the set of the database elements in the hierarchical tree selected from a group of database elements including a database name, a table name, a column name, an index name, and a foreign key name.

9. The method of claim 1 wherein displaying a table view further comprises:

displaying a tabular interface having a tab corresponding to each element in a set of database elements.

10. The method of claim 9 wherein displaying the tabular interface further comprises:

providing a set of entry fields corresponding to the set of database elements that facilitate operating on characteristics associated with each of the database elements.

11. The method of claim 10 wherein displaying the tabular interface further comprises providing the set of database elements selected from a group of database elements including a table name, a column name, an index name, and foreign key name.

12. A method, performed on a computer system, for displaying classes associated with an object-oriented application and tables associated with a database, comprising:

selectively displaying a class view corresponding to classes associated with an object-oriented application and corresponding to tables associated with the database, the displaying further comprising:

displaying a tabular interface having a tab corresponding to each element in a set of object-oriented elements, the displaying a tabular interface further comprising:

providing a set of entry fields that facilitates operating on characteristics associated with each element in the set of object-oriented elements; and providing the set of object-oriented elements selected from a group of object-oriented elements including a package name, a class name, a field name, a relationship name, a lock group name, and an index group name;

permitting access to the classes using the displayed class view;

selectively displaying a table view corresponding to tables associated with a database and corresponding to classes associated with the object-oriented application; and permitting accessing to the tables using the displayed class view.

13. A computer apparatus that facilitates displaying an object-oriented application and tables associated with a database, comprising:

a selectable class view display element corresponding to one or more classes associated with an object-oriented application and corresponding to tables associated with the database, the selectable class view further comprising:

a hierarchical tree representing a set of object-oriented elements corresponding to the object-oriented application, wherein the set of the object-oriented elements in the hierarchical tree is selected from a group including a package name, a class name, a field name, a relationship name, a lock group name, and an index group name;

an access mechanism that provides access to the tables using the selectable class view display element;

a selectable table view display element corresponding to one or more tables associated with a database and corresponding to classes associated with the object-oriented application; and an access mechanism that provides access to the tables using the selectable table view display element.

14. The apparatus of claim 13 further comprising:

a combination table-and-class view display element corresponding to database elements associated with the database and object-oriented elements associated with the object-oriented application.

15. The apparatus of claim 14 wherein the combination table-and-class view display element further comprises:

a column database element and a field object-oriented element.

16. The apparatus of claim 14 wherein the combination table-and-class view display element further comprises:

a foreign key database element and a reference object-oriented element.

17. The apparatus of claim 13 wherein the class view further comprises:

a tabular interface having a tab corresponding to each element in a set of object-oriented elements.

18. The apparatus of claim 17 wherein the tabular interface further comprises:

a set of entry fields that facilitates operating on characteristics associated with each element in the set of object-oriented elements.

19. The apparatus of claim 13 wherein the table view further comprises:

a hierarchical tree representing a set of database elements associated with a set of tables corresponding to the database.

20. The apparatus of claim 19 wherein the set of the database elements in the hierarchical tree is selected from a group of database elements including a database name, a table name, a column name, an index name, and a foreign key name.

21. The apparatus of claim 13 wherein the table view further comprises:

a tabular interface having a tab corresponding to each element in a set of database elements.

22. The apparatus of claim 21 wherein the tabular interface farther comprises:

a set of entry fields corresponding to the set of database elements that facilitate operating on characteristics associated with each of the database elements.

23. The apparatus of claim 22 wherein the set of database elements is selected from a group of database elements including a table name, a column name, an index name, and foreign key name.

24. A computer apparatus that facilitates displaying an object-oriented application and tables associated with a database, comprising:
- a selectable class view display element corresponding to one or more classes associated with an object-oriented application and corresponding to tables associated with the database, the selectable class view further comprising:
  - a tabular interface having a tab corresponding to each element in a set of object-oriented elements, the tabular interface further comprising:
    - a set of entry fields that facilitates operating on characteristics associated with each element in the set of object-oriented elements, wherein the set of object-oriented elements is selected from a group of object-oriented elements including a package name, a class name, a field name, a relationship name, a lock group name, and an index group name;
- an access mechanism that provides access to the tables using the selectable class view display element;
- a selectable table view display element corresponding to one or more tables associated with a database and corresponding to classes associated with the object-oriented application; and
- an access mechanism that provides access to the tables using the selectable table view display element.

25. A computer program product capable of displaying classes associated with an object-oriented application and tables associated with a database, the computer program product comprising program code to cause a data processor to perform:
- selectively displaying a class view corresponding to one or more classes associated with an object-oriented application and corresponding to tables associated with the database, the selectively displaying further comprising:
  - displaying a hierarchical tree representing a set of object-oriented elements corresponding to the object-oriented application, the displaying a hierarchical tree further comprising:
    - providing the set of the object-oriented elements in the hierarchical tree selected from a group including a package name, a class name, a field name, a relationship name, a lock group name, and an index group name;
- permitting access to the classes and related information using the displayed, class view;
- selectively displaying a table view corresponding to one or more tables associated with a database and corresponding to classes associated with the object-oriented application; and
- permitting access to the tables and related information using the displayed class view.

26. The computer program product of claim 25 wherein the code further comprises:
- displaying a combination table-and-class view corresponding to database elements associated with the database and object-oriented elements associated with the object-oriented application.

27. The computer program product of claim 26 wherein the code further comprises:
- displaying a column database element and a field object-oriented element.

28. The computer program product of claim 26 wherein the code further comprises:
- displaying a foreign key database element and a reference object-oriented element.

29. The computer program product of claim 25 wherein the code for displaying a class view further comprises:
- displaying a tabular interface having a tab corresponding to each element in a set of object-oriented elements.

30. The computer program product of claim 29 wherein the code for displaying the tabular interface further comprises:
- providing a set of entry fields that facilitates operating on characteristics associated with each element in the set of object-oriented elements.

31. The computer program product of claim 25 wherein the code for displaying a table view further comprises:
- displaying a hierarchical tree representing a set of database elements associated with a set of tables corresponding to the database.

32. The computer program product of claim 31 wherein the code for displaying a hierarchical tree further comprises:
- providing the set of the database elements in the hierarchical tree selected from a group of database elements including a database name, a table name, a column name, an index name, and a foreign key name.

33. The computer program product of claim 25 wherein the code for displaying a table view further comprises:
- displaying a tabular interface having a tab corresponding to each element in a set of database elements.

34. The computer program product of claim 33 wherein the code for displaying the tabular interface further comprises:
- providing a set of entry fields corresponding to the set of database elements that facilitate operating on characteristics associated with each of the database elements.

35. A computer program product capable of displaying classes, associated with an object-oriented application and tables associated with a database, the computer program product comprising program code to cause a data processor to perform:
- selectively displaying a class view corresponding to one or more classes associated with an object-oriented application and corresponding to tables associated with the database, the selectively displaying further comprising:
  - displaying a tabular interface having a tab corresponding to each element in a set of object-oriented elements, the displaying a tabular interface further comprising:
    - providing a set of entry fields that facilitates operating on characteristics associated with each element in the set of object-oriented elements; and
    - providing the set of object-oriented elements selected from a group object-oriented elements including a package name, a class name, a field name, a relationship name, a lock group name, and an index group name;
- permitting access to the classes and related information using the displayed class view;
- selectively displaying a table view corresponding to one or more tables associated with a database and corresponding to classes associated with the object-oriented application; and
- permitting access to the tables and related information using the displayed class view.

* * * * *

UNITED STATES PATENT AND TRADEMARK OFFICE
CERTIFICATE OF CORRECTION

PATENT NO.     : 6,279,008 B1
DATED          : August 21, 2001
INVENTOR(S)    : Tony Chun Tung NG et al.

It is certified that error appears in the above-identified patent and that said Letters Patent is hereby corrected as shown below:

<u>Title page,</u>
Item [12], delete "Tung Ng et al" and insert -- Ng et al. --.

Signed and Sealed this

Second Day of April, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,279,008 B1
DATED : August 21, 2001
INVENTOR(S) : Tony Chun Tung NG et al.

It is certified that error appears in the above-identified patent and that said Letters Patent is hereby corrected as shown below:

<u>Title page,</u>
Item [73], Assignee, "BAAN" should read -- Baan --; and after "B.V.,", delete "The";

<u>Column 16,</u>
Line 60, "farther" should read -- further --;

<u>Column 17,</u>
Line 48, after "displayed", delete the comma; and

<u>Column 18,</u>
Line 36, after "classes", delete the comma.

Signed and Sealed this

Fourteenth Day of May, 2002

*Attest:*

JAMES E. ROGAN
*Director of the United States Patent and Trademark Office*

*Attesting Officer*